United States Patent [19]
Anderson

[11] Patent Number: 5,983,624
[45] Date of Patent: Nov. 16, 1999

[54] POWER PLANT HAVING A U-SHAPED COMBUSTION CHAMBER WITH FIRST AND SECOND REFLECTING SURFACES

[76] Inventor: J. Hilbert Anderson, 2422 S. Queen St., York, Pa. 17402-4995

[21] Appl. No.: 08/840,476

[22] Filed: Apr. 21, 1997

[51] Int. Cl.[6] ..................................................... F02G 1/00
[52] U.S. Cl. .......................................... 60/39.77; 60/39.38
[58] Field of Search ................................... 60/727, 39.38, 60/39.39, 39.76, 39.77, 39.78

[56] References Cited

U.S. PATENT DOCUMENTS

| | | | |
|---|---|---|---|
| 2,614,387 | 10/1952 | Anderson | 60/39.77 |
| 2,627,163 | 2/1953 | Anderson et al. | 60/39.77 |
| 2,705,867 | 4/1955 | Lewis | 60/39.78 |
| 2,731,795 | 1/1956 | Bodine, Jr. | 60/39.77 |
| 4,175,380 | 11/1979 | Baycura | 60/39.77 |

*Primary Examiner*—Charles G. Freay
*Attorney, Agent, or Firm*—Jeffrey S. Melcher; Farkas & Manelli, PLLC

[57] ABSTRACT

Provided is a combustion chamber for producing a pressurized gas containing: a wall structure defining an interior chamber; a first reflecting surface for reflecting a pressure wave within the interior chamber; a second reflecting surface for reflecting the pressure wave within the interior chamber, wherein the first and second reflecting surfaces are constructed and arranged to resonate the pressure wave in the interior chamber; at least one first inlet for introducing a first gas into the interior chamber; and at least one outlet from the interior chamber for drawing off a pressurized gas from the interior chamber. Also provided is a turbine engine containing the combustion chamber, and an electrical generating power plant containing the turbine engine.

46 Claims, 14 Drawing Sheets

Fig. 1 [Prior Art]
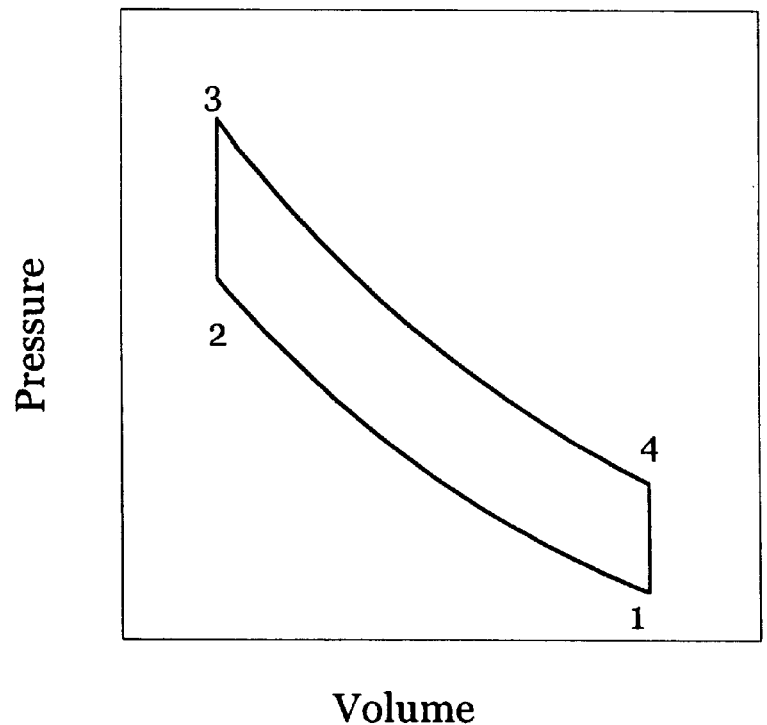
Fig. 2 [Prior Art]
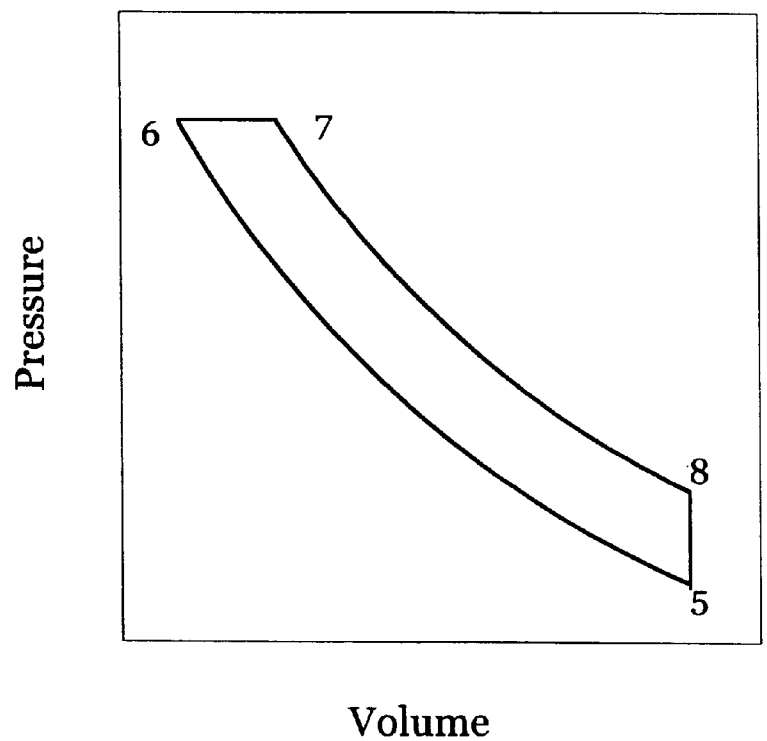

Fig. 3 [Prior Art]
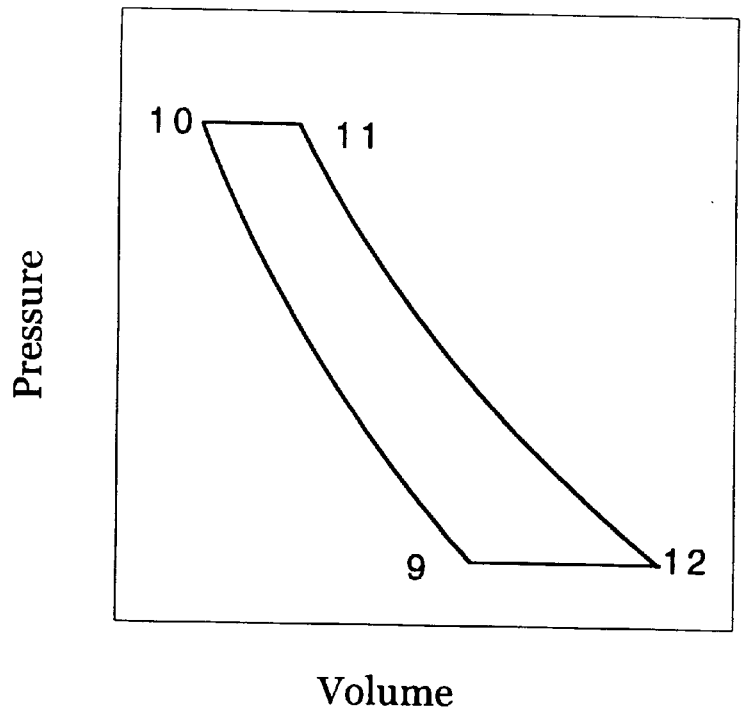
Fig. 4
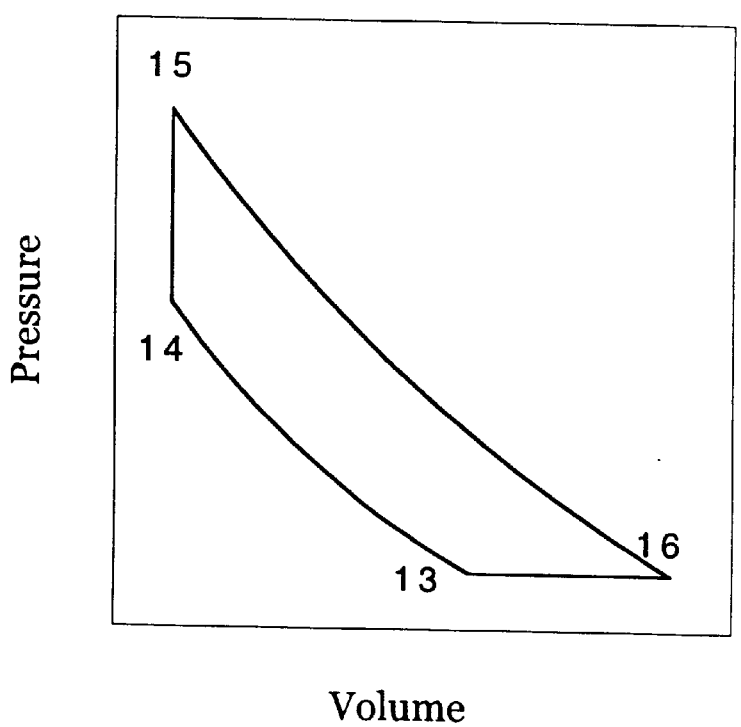

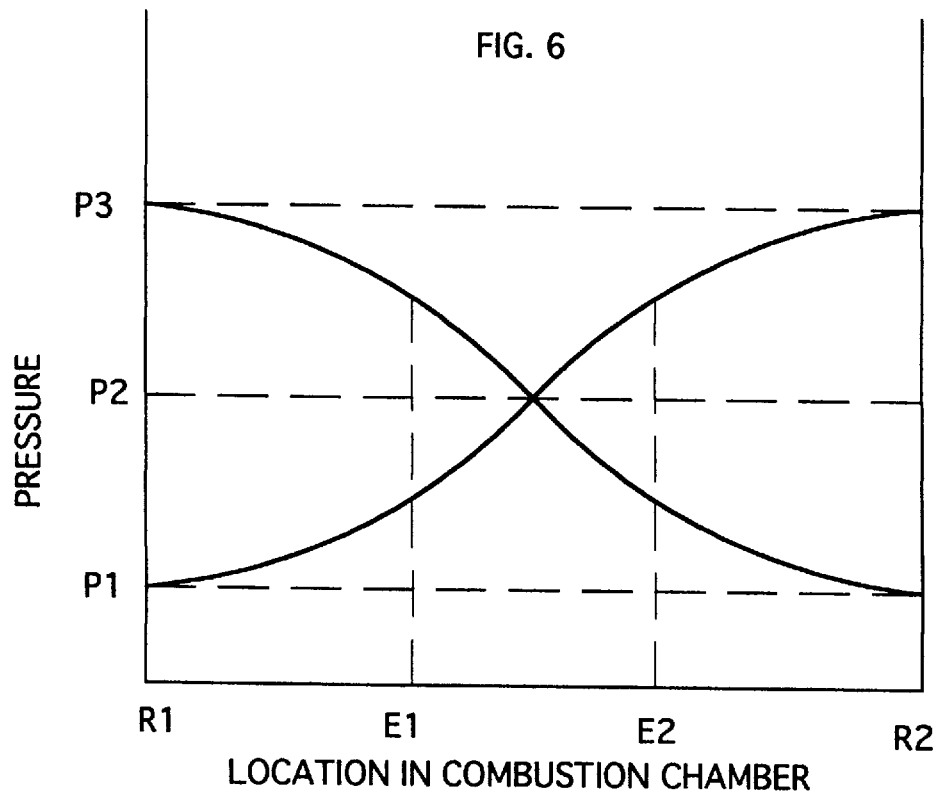
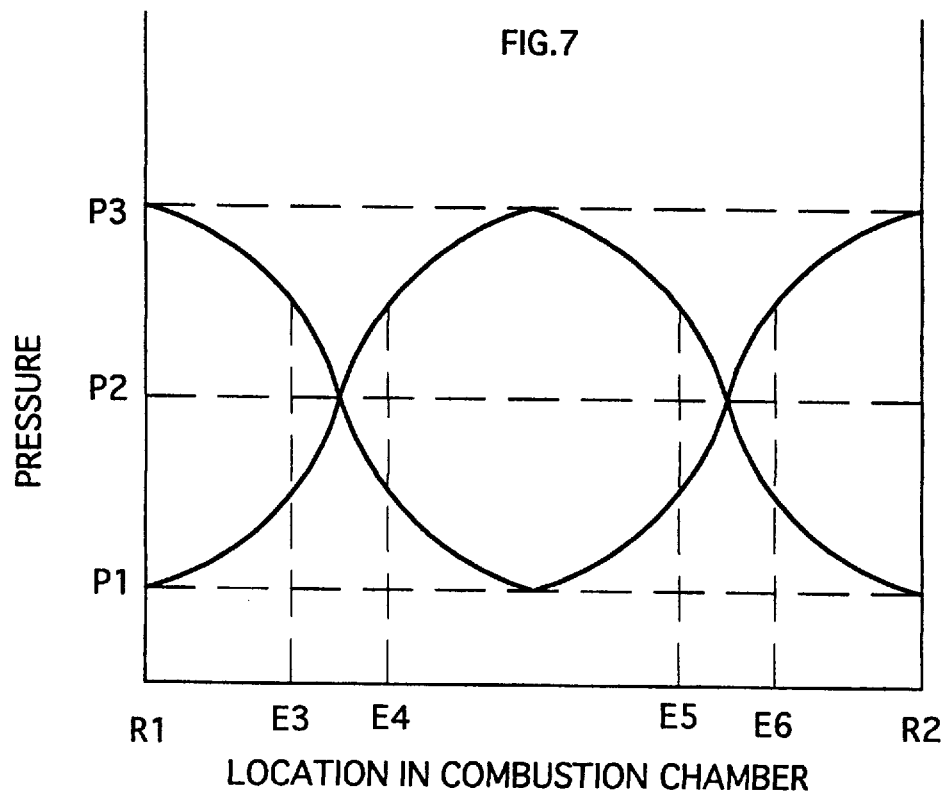

ARRANGEMENT OF 6 EXPLOSION CHAMBERS
AROUND CIRCUMFERENCE OF THE TURBINE
NEAR THE COMPRESSOR DISCHARGE
SECTION

POWER PLANT HAVING A U-SHAPED COMBUSTION CHAMBER WITH FIRST AND SECOND REFLECTING SURFACES

BACKGROUND OF THE INVENTION

1. Field of the Invention

The invention relates to a high pressure gas cycle for use in an engine. The invention also relates to an electrical power generating plant.

2. Background of Related Art

The Otto cycle shown diagrammatically in FIG. 1 [Prior Art], with pressure as the ordinate and volume as the abscissa, is a cycle that closely represents the explosion and compression stages of a gasoline automobile engine. In the Otto cycle, the air is drawn in at atmospheric pressure, shown at 1, then compressed isentropically to a high pressure with fuel mixed in the air, shown at 2. The fuel air mixture explodes at a theoretically constant volume to form a combustion gas having an increased pressure, shown at 3. The combustion gas expands isentropically back to the original inlet volume, shown at 4, where the combustion gas is then discharged. As shown in FIG. 1, the combustion gas discharges at a pressure above atmosphere, shown at 4, and then the pressure drops to atmosphere as it exhausts from the engine, not shown. The energy that could be available by expanding from exhaust pressure to atmospheric pressure, represented by the difference between 4 and 1 shown in FIG. 1, is wasted.

The theoretical efficiency of the Otto Cycle is defined by the relationship $1-(V_2/V_1)^{(K-1)}$ where $V_1/V_2$ is the ratio of the volume before compression to the volume after compression, commonly called the compression ratio. K=ratio of specific heat at constant pressure to specific heat at constant volume=$C_p/C_v$.

Another cycle commonly used in automobile engines is the Diesel cycle. The pressure vs. volume diagram for a Diesel cycle is shown in FIG. 2 [Prior Art]. In a Diesel cycle, air is drawn in at atmospheric pressure, shown at 5, and then the air is compressed, shown at 6. The fuel is injected after the air is compressed and burns at somewhere near constant pressure to form a combustion gas, shown at 7. The combustion gas expands isentropically back to the original inlet volume, shown at 8, where the combustion gas is then discharged. As shown in FIG. 2, the combustion gas discharges at a pressure above atmosphere, shown at 8, and then the pressure drops to atmosphere as it exhausts from the engine, not shown. The energy that could be available by expanding from exhaust pressure to atmospheric pressure, represented by the difference between 8 and 5 shown in FIG. 5, is wasted.

The advantage of the Diesel cycle compared to the Otto cycle is that the compression ratio can be made much higher than that for the Otto Cycle, because the fuel is not mixed in the air, and therefore the rise during compression in temperature will not ignite the fuel until after the fuel is injected at the high pressure. In general, this increase in compression ratio for the Diesel Cycle enables the Diesel cycle to achieve higher efficiencies than are possible with the Otto Cycle.

The compression ratio for the Otto Cycle is usually limited to about 10 to 1, corresponding to a pressure ratio of about 25 to 1. The reason for this is that at higher ratios the fuel air mixture becomes so hot that the explosion occurs before the mixture is fully compressed. This preignition or detonation actually decreases the power output.

In the Diesel engine the fuel injection occurs after compression, and only air is being compressed during the compression cycle. Therefore, typical compression ratios are 23 to 1, corresponding to pressure ratios of 82 to 1. This is the basic reason why the Diesel cycle is more efficient than the Otto cycle.

A further cycle is the Brayton or Joule cycle, as shown in FIG. 3 [Prior Art]. In the Brayton cycle, air is drawn into a compressor at atmospheric pressure, shown at 9, and then compressed to a high pressure, shown at 10. Fuel is injected into the compressed air in the combustor, where it burns at nearly a constant pressure (except for friction losses in the combustor) to form a combustion gas, shown at 11. The combustion gas expands isentropically back to atmospheric pressure, shown at 12. In this case, the expansion to atmospheric pressure is advantageous, and the theoretical efficiency is like the Otto cycle above in that the theoretical efficiency is equal to $1-(V_2/V_1)^{(K-1)}$ where $V_1/V_2$ is again the volume ratio of specific volume at atmospheric pressure divided by the specific volume at the pressure at which burning starts. The Brayton cycle is the cycle commonly used in gas turbines, and is limited in efficiency by the fact that the temperature of the gas entering the turbine is nearly the same as the combustion temperature. Therefore the combustion temperatures possible in a gas turbine system are usually limited to approximately 2300 to 2600° F. However, the Brayton cycle does have an advantage over the Otto cycle in that complete expansion back to essentially atmosphere is achieved.

A disadvantage of the Brayton cycle is that as pressure ratios or compression ratios are increased the temperature leaving the compressor and entering the combustor becomes higher. Therefore, less fuel energy can be added because of the temperature limit of the turbine. For this reason, although efficiency can be increased by increasing the pressure ratio in a gas turbine cycle, the output gradually decreases as higher pressure ratios are used. Therefore, it is common practice to limit the pressure ratio in industrial gas turbines to about 10 to 20 atmospheres.

Table 1 shows typical theoretical performance calculations for the Brayton cycle, based on air standard data and constant mass flow through the cycle.

TABLE 1

| | A | B | C | D | E | F | G | H | I |
|---|---|---|---|---|---|---|---|---|---|
| 1 | P2/P1 | 32 | 32 | 32 | 32 | 32 | 32 | 32 | 32 |
| 2 | T1 | 520 | 520 | 520 | 520 | 520 | 520 | 520 | 520 |
| 3 | T3 | 2810 | 2810 | 2810 | 2810 | 2810 | 2810 | 2810 | 2810 |
| 4 | P1/J | 2.7201 | 2.7201 | 2.7201 | 2.7201 | 2.7201 | 2.7201 | 2.7201 | 2.7201 |
| 5 | V1 | 13.089 | 13.089 | 13.089 | 13.089 | 13.089 | 13.089 | 13.089 | 13.089 |
| 6 | EFF COMP | 1 | 0.9 | 0.85 | 0.9 | 0.9 | 0.9 | 0.9 | 0.9 |
| 7 | COOL FACT | 1 | 1 | 1 | 0.9 | 0.8 | 0.7 | 0.6 | 0.5 |

TABLE 1-continued

|  |  |  |  |  |  |  |  |  |
|---|---|---|---|---|---|---|---|---|
| 8 N/(N − 1) CO | 3.463 | 3.1167 | 2.94355 | 3.463 | 3.895875 | 4.452429 | 5.1945 | 6.2334 |
| 9 (N − 1)/N CO | 0.288767 | 0.320852 | 0.339726 | 0.288767 | 0.256682 | 0.224597 | 0.192511 | 0.160426 |
| 10 N COMP | 1.406009 | 1.472434 | 1.514522 | 1.406009 | 1.345319 | 1.289651 | 1.238407 | 1.19108 |
| 11 EFF TURB | 1 | 0.9 | 0.85 | 0.9 | 0.9 | 0.9 | 0.9 | 0.9 |
| 12 N/(N − 1) TU | 3.463 | 3.847778 | 4.074118 | 3.847778 | 3.847778 | 3.847778 | 3.847778 | 3.847778 |
| 13 (N − 1)N TU | 0.288767 | 0.25989 | 0.245452 | 0.25989 | 0.25989 | 0.25989 | 0.25989 | 0.25989 |
| 14 N TURB | 1.406009 | 1.351151 | 1.325297 | 1.351151 | 1.351151 | 1.351151 | 1.351151 | 1.351151 |
| 15 W IN | 212.1196 | 251.5701 | 276.9102 | 235.6885 | 221.0261 | 207.4814 | 194.9616 | 183.3819 |
| 16 V1/V2 | 11.76285 | 10.52493 | 9.858518 | 11.76285 | 13.14636 | 14.6926 | 16.4207 | 18.35205 |
| 17 T2/T1 | 2.72043 | 3.0404 | 3.245924 | 2.72043 | 2.434134 | 2.177968 | 1.94876 | 1.743674 |
| 18 T2 | 1414.624 | 1581.008 | 1687.88 | 1414.624 | 1265.75 | 1132.543 | 1013.355 | 906.7106 |
| 19 HEAT IN | 330.8437 | 291.3941 | 266.0545 | 330.8437 | 366.1417 | 397.725 | 425.9845 | 451.2699 |
| 20 V3 | 2.210342 | 2.210342 | 2.210342 | 2.210342 | 2.210342 | 2.210342 | 2.210342 | 2.210342 |
| 21 W EXPAN | 421.3532 | 395.5742 | 381.6844 | 395.5742 | 395.5742 | 395.5742 | 395.5742 | 395.5742 |
| 22 NET WORK | 209.2335 | 144.0041 | 104.7742 | 159.8857 | 174.5481 | 188.0928 | 200.6127 | 212.1923 |
| 23 EFF | 0.632424 | 0.49419 | 0.393807 | 0.483267 | 0.476723 | 0.472922 | 0.470939 | 0.470212 |

|  | J | K | L | M | N | O | P |
|---|---|---|---|---|---|---|---|
| 1 | 32 | 32 | 32 | 32 | 32 | 32 | 32 |
| 2 | 520 | 520 | 520 | 520 | 520 | 520 | 520 |
| 3 | 2810 | 2810 | 2810 | 2810 | 2810 | 2810 | 2810 |
| 4 | 2.7201 | 2.7201 | 2.7201 | 2.7201 | 2.7201 | 2.7201 | 2.7201 |
| 5 | 13.089 | 13.089 | 13.089 | 13.089 | 13.089 | 13.089 | 13.089 |
| 6 | 0.9 | 0.9 | 0.9 | 0.9 | 0.9 | 0.9 | 0.9 |
| 7 | 0.4 | 0.3 | 0.2 | 0.1 | 0.05 | 0.04 | 0.03 |
| 8 | 7.79175 | 10.389 | 15.5835 | 31.167 | 62.334 | 77.9175 | 103.89 |
| 9 | 0.128341 | 0.096256 | 0.06417 | 0.032085 | 0.016043 | 0.012834 | 0.009626 |
| 10 | 1.147237 | 1.106508 | 1.068571 | 1.033149 | 1.016304 | 1.013001 | 1.009712 |
| 11 | 0.9 | 0.9 | 0.9 | 0.9 | 0.9 | 0.9 | 0.9 |
| 12 | 3.847778 | 3.847778 | 3.847778 | 3.847778 | 3.847778 | 3.847778 | 3.847778 |
| 13 | 0.25989 | 0.25989 | 0.25989 | 0.25989 | 0.25989 | 0.25989 | 0.25989 |
| 14 | 1.351151 | 1.351151 | 1.351151 | 1.351151 | 1.351151 | 1.351151 | 1.351151 |
| 15 | 172.6651 | 162.7406 | 153.5437 | 145.0155 | 140.9852 | 140.197 | 139.4146 |
| 16 | 20.51057 | 22.92296 | 25.6191 | 28.63234 | 30.26937 | 30.60784 | 30.9501 |
| 17 | 1.560171 | 1.39598 | 1.249068 | 1.117617 | 1.057174 | 1.045484 | 1.033922 |
| 18 | 811.289 | 725.9096 | 649.5154 | 581.1609 | 549.7306 | 543.6515 | 537.6396 |
| 19 | 473.8944 | 494.1378 | 512.2509 | 528.4577 | 535.9099 | 537.3512 | 538.7766 |
| 20 | 2.210342 | 2.210342 | 2.210342 | 2.210342 | 2.210342 | 2.210342 | 2.210342 |
| 21 | 395.5742 | 395.5742 | 395.5742 | 395.5742 | 395.5742 | 395.5742 | 395.5742 |
| 22 | 222.9091 | 232.8337 | 242.0305 | 250.5587 | 254.589 | 255.3772 | 256.1596 |
| 23 | 0.470377 | 0.471192 | 0.472484 | 0.474132 | 0.475059 | 0.475252 | 0.475447 |

In Table 1 the following definitions are used:

$P_2/P_1$ is the pressure ratio

T1=air inlet temperature in ° R (degrees Rankin)

T3=combustion temperature in ° R

P1/J=inlet pressure in lbs/ft$^2$/778.2

V1=inlet specific volume in ft$^3$/lb.

EFF COMP is polytropic compression efficiency

COOL FACT is a factor that is multiplied by (N−1)/N, where (N−1)/N=(k−1)/K/comp EFF., and (K−1)/K=0.2888. This factor shows a new value of (N−1)/N that simulates continuous intercooling during the compression process. Actual intercooling is a step-by-step process, but this simulation shows the approximate effect of intercooling.

(N−1)/N CO=(K−1)/K/EFF COMP×COOL FACT

N Comp. is the polytropic exponent used in the equation for work

EFF TURB is the polytropic efficiency of the turbine (N−1)/N TU=(k−1)/K×EFF TURB WIN=Compressor work in Btu/lb V1/V2=Compression ratio T2/T1=Ratio compressor discharge temperature/inlet temperature T2=Compressor discharge temperature ° R Heat IN=Heat Input from T2 to T3, assuming specific heat=0.2371 Btu/lb° F.

V3=Specific volume at turbine inlet in cu.ft./lb

W EXPAN=Turbine work output in Btu/lb

NET WORK=W EXPAN-WIN

EFF=NETWORK/HEAT IN=cycle efficiency

In column C, the Brayton cycle efficiency is listed as 0.494. This is higher than the actual efficiency of a gas turbine because leakage losses, cooling air losses, pressure drop in the combustor, and losses due to kinetic energy of the gases leaving the turbine column D, where efficiencies of 85% are used for compressor and turbine, were excluded.

It would be advantageous if one could combine the constant volume or explosion cycle as shown in the Otto cycle at the high pressure end, and at the same time expand the volume all the way to atmospheric pressure at the exhaust end, as shown FIG. 4. FIG. 4 is a theoretical complete expansion cycle.

An almost complete expansion cycle was made by Sargent, in which the air inlet to the engine is throttled to take in less air volume and thereby allow for an increase in volume in the exhaust. However, this Sargent cycle was not a success in a reciprocating engine because of the high mechanical friction losses.

Thus, there is a need for a complete expansion cycle that is suitable for use in a reciprocating engine, which substantially avoids wasting energy due to exhaust pressures that are greater than atmospheric pressure.

There is also a need for an improved combustion chamber that is capable of supplying compressed gas to a turbine blade at temperatures significantly below the combustion temperature of the fuel being burned.

There is a further need for an improved apparatus for supplying a compressed gas having significantly reduced friction losses.

Electrical power plants utilizing turbine engines to drive electrical generators produce large amounts of combustion gasses which contain carbon dioxide and byproducts such as nitrogen oxides. Furthermore, the exhaust gas from conventional turbine engines usually has a temperature of about 700° F. to about 1240° F. Typically a Rankine cycle system is used to recover valuable energy from the exhaust gas. However, efficient low temperature vapor turbines usually cannot be used because the exhaust temperature from a conventional turbine engine is too high. Exhaust temperatures from conventional turbine engines usually require the use of an expensive steam turbine to recover the energy.

Thus, there is a need for an electrical generating power plant comprising more efficient turbines to reduce the quantity of combustion gasses produced, and for turbine engines having exhaust temperature suitable for use in driving low temperature vapor turbines.

SUMMARY OF THE INVENTION

It is an objective of the present invention to provide a substantially complete expansion cycle that is suitable for use in a gas turbine engine, that substantially avoids wasting energy due to exhaust pressures that are greater than atmospheric pressure.

Another objective of the present invention is to provide an engine that utilizes a substantially complete expansion cycle, which substantially avoids wasting energy due to exhaust pressures that are greater than atmospheric pressure.

A further objective of the present invention is to provide an improved combustion chamber that is capable of producing a pressurized gas for driving a turbine blade at a temperature significantly below the combustion temperature of the fuel being burned in the combustion chamber.

Another objective of the present invention is to provide an improved combustion chamber for producing a pressurized gas, which has significantly reduced friction losses.

A further objective of the present invention is to provide a method for forming a pressurized gas, which can be converted to mechanical energy in an engine.

Another objective of the present invention is to provide an electrical generating power plant comprising more efficient turbines to reduce the quantity of combustion gasses produced.

A further objective is to provide an electrical generating power plant comprising a turbine engine an efficient low temperature vapor turbine driven by the exhaust from said turbine engine.

The above objectives and other objectives are surprisingly achieved by the following.

Provided is a novel combustion chamber for producing a pressurized gas comprising:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber; and at least one outlet from said interior chamber for drawing off a pressurized gas from said interior chamber.

Also provided is a novel turbine engine comprising:

at least one combustion chamber;

at least one compressor constructed and arranged to provide a compressed gas to said at least one combustion chamber; and at least one turbine blade constructed and arranged to be driven by a pressurized gas formed in said combustion chamber; wherein said combustion chamber comprises:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber;

at least one second inlet for introducing said compressed gas into said interior chamber, said second inlet being connected to said at least one compressor; and at least one outlet from said interior chamber for drawing off said pressurized gas from said chamber and being constructed and arranged to supply said pressurized gas to said at least one turbine blade.

The present invention also provides a novel electrical generating power plant comprising:

at least one turbine engine;

at least one electrical generator connected to said turbine engine; wherein said turbine engine comprises:

at least one combustion chamber;

at least one compressor constructed and arranged to provide a compressed gas to said at least one combustion chamber; and at least one turbine blade constructed and arranged to be driven by a pressurized gas formed in said combustion chamber; wherein said combustion chamber comprises:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber;

at least one second inlet for introducing said compressed gas into said interior chamber, said second inlet being connected to said at least one compressor; and at least one outlet from said interior chamber for drawing off said pressurized gas from said chamber and being constructed and arranged to supply said pressurized gas to said turbine blade.

Also provided is a novel method of forming a pressurized gas having a temperature lower than a combustion temperature of a combustible gas used to form said pressurized gas comprising the steps of:

introducing a combustible gas into a combustion chamber having first and second reflecting surfaces that are constructed and arranged to provide a resonating pressure wave reflecting between said first and second reflecting surfaces, said combustible gas being introduced into said combustible chamber at a frequency such that said resonating pressure wave ignites said combustible gas to thereby form a resonating pressure wave;

introducing a second gas into said combustion chamber at a location and frequency such that said pressure wave compresses and combines with said second gas to form a pressurized gas having a temperature lower than a combustion temperature of said combustible gas; and withdrawing said pressurized gas from said combustion chamber.

BRIEF DESCRIPTION OF THE DRAWINGS

FIG. 1 [Prior Art] illustrates a graph of the pressure vs. volume for an Otto cycle engine.

FIG. 2 [Prior Art] illustrates a graph of the pressure vs. volume for a Diesel cycle engine.

FIG. 3 [Prior Art] illustrates a graph of the pressure vs. volume for a Brayton cycle engine.

FIG. 4 illustrates a graph of the pressure vs. volume for a theoretical complete expansion cycle.

FIG. 6 illustrates a diagram of a resonating pressure wave in a combustion chamber having a length that is one-half of the wavelength of the pressure wave.

FIG. 7 illustrates a diagram of a resonating pressure wave in a combustion chamber having a length that is one wavelength of the pressure wave.

DETAILED DESCRIPTION OF PREFERRED EMBODIMENTS

The present invention will be further explained with reference to the attached drawings. The present invention provides a combustion chamber for producing a pressurized gas, which has significantly reduced friction losses. Furthermore, the pressurized gas introduced into the combustion chamber can be provided at a temperature which is significantly lower than the combustion temperature of the fuel being burned in the combustion chamber. Moreover, the combustion chamber utilizes detonation of a combustible gas to provide improved burning efficiency and reduced byproducts such as nitrogen oxides.

The improved combustion chamber according to the present invention will be explained with reference to a turbine engine. However, it will be understood by one skilled in the art that the pressurized gas produced by the combustion chamber can be converted to mechanical energy using other means besides a turbine blade. For example, the pressurized gas can be used to drive a reciprocating piston. The pressurized gas could also be used for jet propulsion.

The present invention demonstrates that unexpectedly it is possible to attain the advantages of an explosion cycle at high pressures, and also to achieve substantially complete expansion of the exhaust, thereby greatly improving the cycle efficiency of an engine. A combustion chamber can be provided that is capable of supplying pressurized gas to a turbine blade at temperatures significantly below the combustion temperature of the fuel being burned. By producing a pressurized gas having a temperature below combustion temperatures, the following advantages can be attained:

(1) significantly greater pressure ratios can be utilized in the turbine while not exceeding the temperature limits of the turbine blades;

(2) greater amounts of fuel can be burned while not exceeding the temperature limits of the turbine blades;

(3) net power output of the turbine can be greatly increased; and (4) at the higher pressure ratios achieved by the combustion chamber according to the present invention, specific volumes are lower, thereby permitting shorter turbine blades, that are stronger and easier to cool compared with longer turbine blades.

Figure 5:
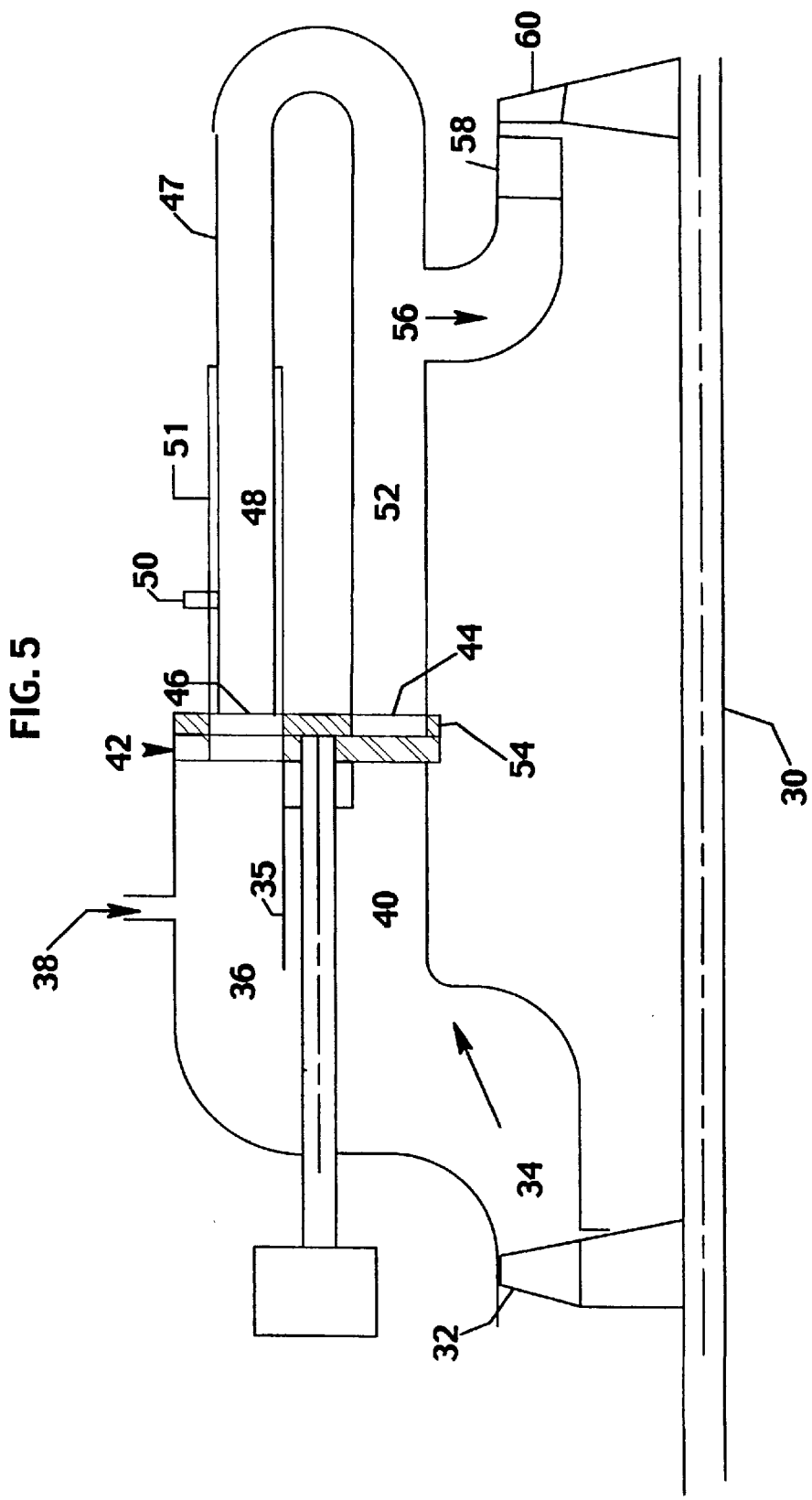
FIG. 5 illustrates a schematic diagram of an engine utilizing a high pressure cycle according to the present invention.
Figure 9:
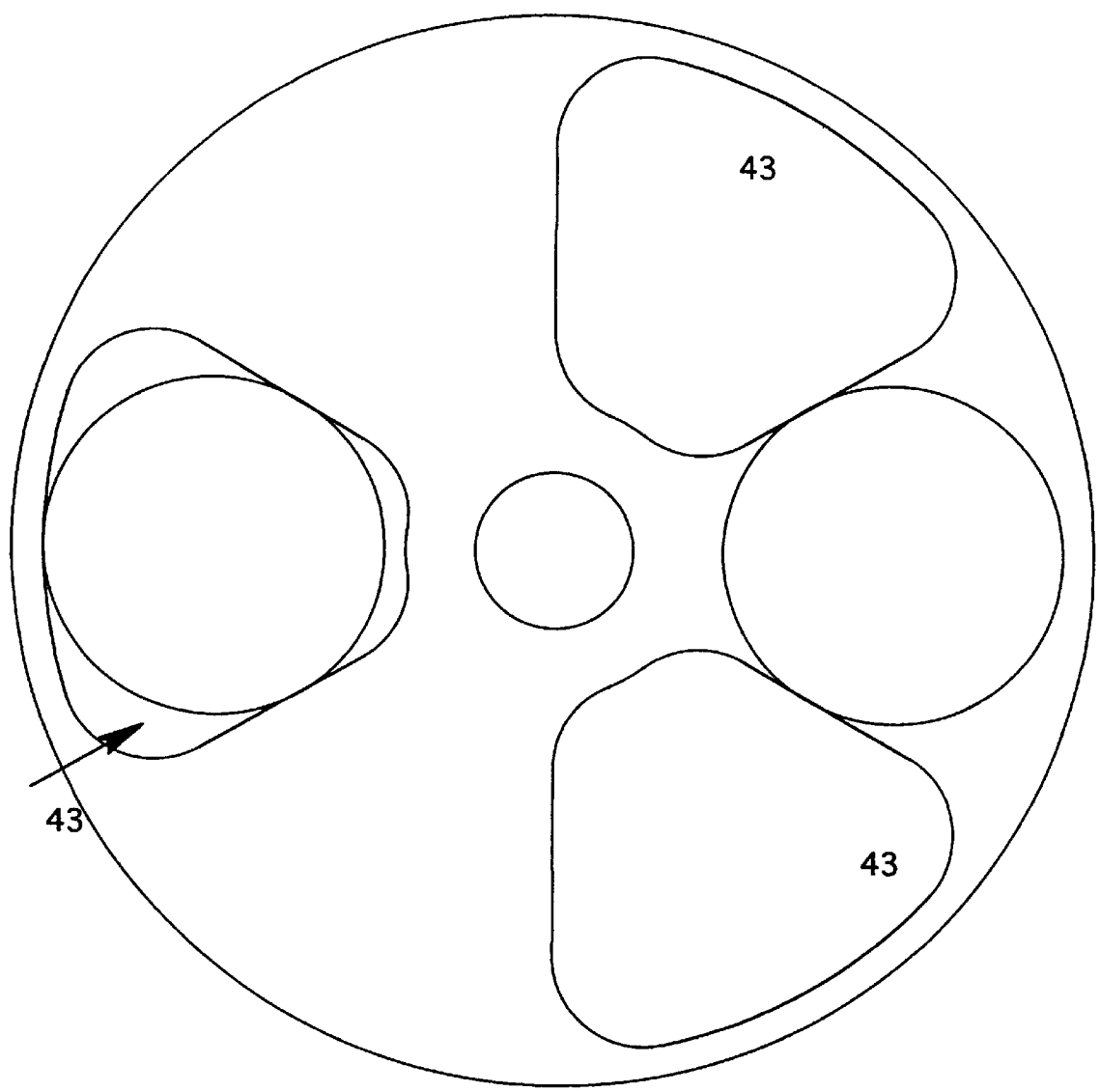
FIG. 9 is a cross-sectional view of a rotary distributor valve according to the present invention.
Figure 10:
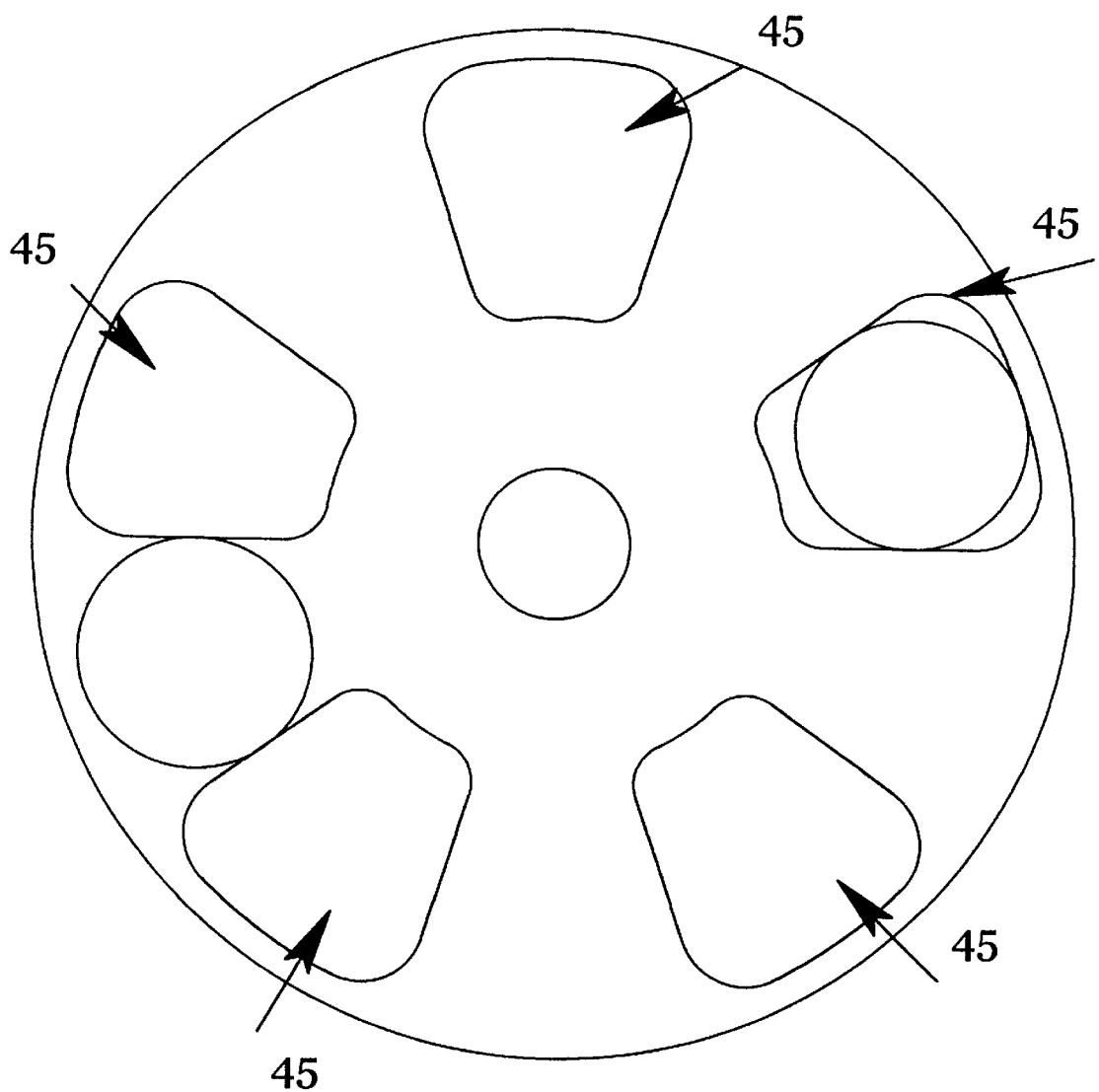
FIG. 10 is a cross-sectional view of a rotary distributor valve according to the present invention.

FIG. 5 illustrates a cross-sectional view of an embodiment of the high pressure cycle according to the present invention which is used in a turbine engine. On the left end of the shaft shown at 30 is the last stage of a series of axial flow compressor blades, the last blade being shown at 32. Air is compressed by the compressor blades and discharged from the compressor, shown at 34. After leaving the air compressor, the compressed air enters a chamber which is divided into two sections by a divider plate, shown at 35. In an upper section, shown generally at 36, fuel is introduced into the chamber through a fuel inlet, shown at 38, and mixes with the air. In the lower section, shown generally at 40, the air remains substantially free-of fuel. The air/fuel mixture is discharged through the inlet of a valve, shown at 42, into a combustion chamber. The combustion chamber, shown at 47, comprises an explosion chamber, shown generally at 48, and a compression chamber, shown generally at 52. Any valve that is suitable for controlling the flow of a compressed gas into the combustion chamber can be utilized. Preferably, the valve is capable of synchronizing the flow of gas into the combustion chamber with a resonating pressure wave therein, whereby the valve is open when the combustion chamber pressure is lower than average and closed when the combustion chamber pressure is greater than average. A non-limiting preferred example of a valve is a distributor rotary valve, examples of which are illustrated in FIGS. 9 or 10, described below. Based on the disclosure provided herein, one skilled in the art will be able to select the desired valve for the desired application.

As shown in FIG. 5, as the rotary valve rotates it alternately opens the valve to the lower air compression chamber, shown at 44, and the valve to the upper explosion chamber, shown at 46. The air/fuel mixture enters the explosion chamber shown at 48 and is ignited by a high pressure wave compressing the mixture, or alternatively by an igniting device, shown at 50, such as a spark plug. The explosion of the air/fuel mixture starts a pressure wave down the channel of the explosion chamber and curves around until it compresses air previously introduced through the open valve 44 (now closed) against the lower valve plate shown at 54. The general area where the air is compressed in the combustion chamber is shown generally at 52. The pressure wave is then reflected back the direction it came and the pressure wave compresses a new air/fuel mixture to create another explosion in the explosion chamber 48. Thus, there is a continuous alternating cycle between explosions creating a pressure wave which compresses air in the air compression chamber and reflections of the pressure wave that compress the air/fuel mixture to cause the explosions. Preferably, the frequency of the explosions is controlled to provide a resonating pressure wave in the tube. This means that the pressure in the tube alternates between the following two stages:

(A) high pressure in the compression chamber 48 and low pressure in the compressor chamber 52 during the explosion stage; and (B) low pressure in the compression chamber 48 and high pressure in the compressor chamber 52 during the compressing of the air (compression stage).

Examples of means for adjusting the frequency of explosions in the combustion chamber include;

(1) adjusting the length of the tube;
(2) adjusting the frequency of the air/fuel mixture entering the combustion chamber;
(3) adjusting the temperature of gas contained within combustion chamber;
(4) adjusting the amount of air/fuel mixture being supplied to the combustion chamber;
(5) adjusting the speed of the rotary valve; and
(6) adjusting the relative flow areas, shown at 44 and 46 in the Figures.

The combustion chamber can be adjusted to be a length that provides the desired resonant frequency. For example, if the length of the tube is one-half of the pressure wave length and the frequency of explosions resonate, then the pressure at somewhere near the middle of the wave travel remains practically constant (about an average of the combustion chamber pressure), but is significantly higher than the inlet pressure coming from the air compressor. Examples of suitable combustion chamber lengths for providing a resonating pressure wave include, but are not limited, to the following combustion chamber lengths shown in FIGS. 6 and 7.

FIG. 6 illustrates a combustion chamber having a length that is one-half of the wave length of the pressure wave. Between the points E1 and E2 in the combustion chamber, the pressure variation is significantly less than elsewhere in the combustion chamber, such as at the first reflecting surface R1 or at the second reflecting surface R2. At R1 and R2, the pressure varies from P1 to P3. Between the points E1 and E2, the pressure varies significantly less between P1 to P3. Thus, the gas flow taken from the combustion chamber between the points E1 and E2 will fluctuate significantly less than the gas flow taken elsewhere from the combustion chamber. Preferably, the gas flow taken from the combustion chamber is at substantially the average combustion chamber pressure, shown at P2.

FIG. 7 illustrates a combustion chamber having a length that is one wave length of the pressure wave. Between the points E3 and E4 or the points E5 and E6 in the combustion chamber, the pressure variation is significantly less than elsewhere in the combustion chamber, such as at the first reflecting surface R1 or at the second reflecting surface R2. At R1 and R2, the pressure varies from P1 to P3. Between the points E3 and E4 or between E5 and E6, the pressure varies significantly less than between P1 to P3. Thus, the gas flow taken from the combustion chamber between the points E3 and E4 or between the points E5 and E6 will fluctuate significantly less than the gas flow taken elsewhere from the combustion chamber. Preferably, the gas flow taken from the combustion chamber is at substantially the average combustion chamber pressure, shown at P2.

The resonating pressure waves shown in FIGS. 6 and 7 represent a combustion chamber having a constant temperature throughout the length of the combustion chamber. However, when a combustion chamber is used where an air/fuel mixture is injected into the combustion chamber at or near the first reflecting surface R1 and air is injected into the combustion chamber at or near the second reflecting surface R2, the temperature will be significantly higher near the first reflecting surface where combustion is occurring than at the second reflecting surface. Since the compression wave travels faster as the temperature is increased, the resonating pressure waves shown in FIGS. 6 and 7 will be skewed away from first reflecting surface R1. Thus, the part of the combustion chamber defined between E1 and E2 will be farther from the first reflecting surface R1 and closer to the second reflecting surface R2 than shown in FIG. 6. Similarly, the parts of the combustion chamber defined between E3 and E4, and between E5 and E6, will be farther from the first reflecting surface R1 and closer to the second reflecting surface R2 than shown in FIG. 7. Based on the disclosure provided herein, one skilled in the art will easily be able to determine the location in the combustion chamber that provides a substantially constant gas flow pressure.

As shown in FIG. 5, the outlet from the compression chamber, shown at 56, is farther away from the inlet for the air/fuel mixture than it is from the inlet for the air. As explained above, since the temperature of the exploding air/fuel mixture is much higher than that of the air in the air compression chamber, the velocity of the pressure wave corresponding to acoustic velocity in the gas is much higher in the hotter explosion chamber than in the colder compression chamber. Typically, the acoustic velocity is proportional to the square root of the absolute temperature. Therefore, the point at which the pressure remains constant in the system with proper tuning will be closer to the air compression chamber portion than it is to the explosion chamber portion of the combustion chamber. The hot exploding air/fuel mixture forms a hot combustion gas that mixes with the cooler air compression gases to form a pressurized gas having a temperature somewhere between the explosion temperature (or combustion temperature of the fuel/air mixture) and the air compression temperature. The pressurized gas then flows out of the combustion chamber through turbine nozzles to drive the turbine blades. The result of this system is that the pressure of the pressurized gas contacting the turbine blades can be considerably higher than the pressure of the compressed air formed by the air compressor. In particular, the exploding air/fuel mixture forms a pressure wave that acts as a piston to further compress the compressed air introduced into the compression chamber portion of the combustion chamber to form a mixture of twice compressed air and combustion gasses, referred to as pressurized gas. The pressurized gas can be withdrawn from the combustion chamber at a pressure significantly higher than the pressure of the compressed air entering the combustion chamber. Furthermore, the temperature of the pressurized gas leaving the combustion chamber is significantly less than the air/fuel mixture explosion temperature (or combustion temperature of the air/fuel mixture). Thus, more air/fuel mixture can be burned in the combustion chamber according to the present invention while not exceeding the temperature limit of the turbine blades, compared to conventional combustion chambers.

Figure 8:
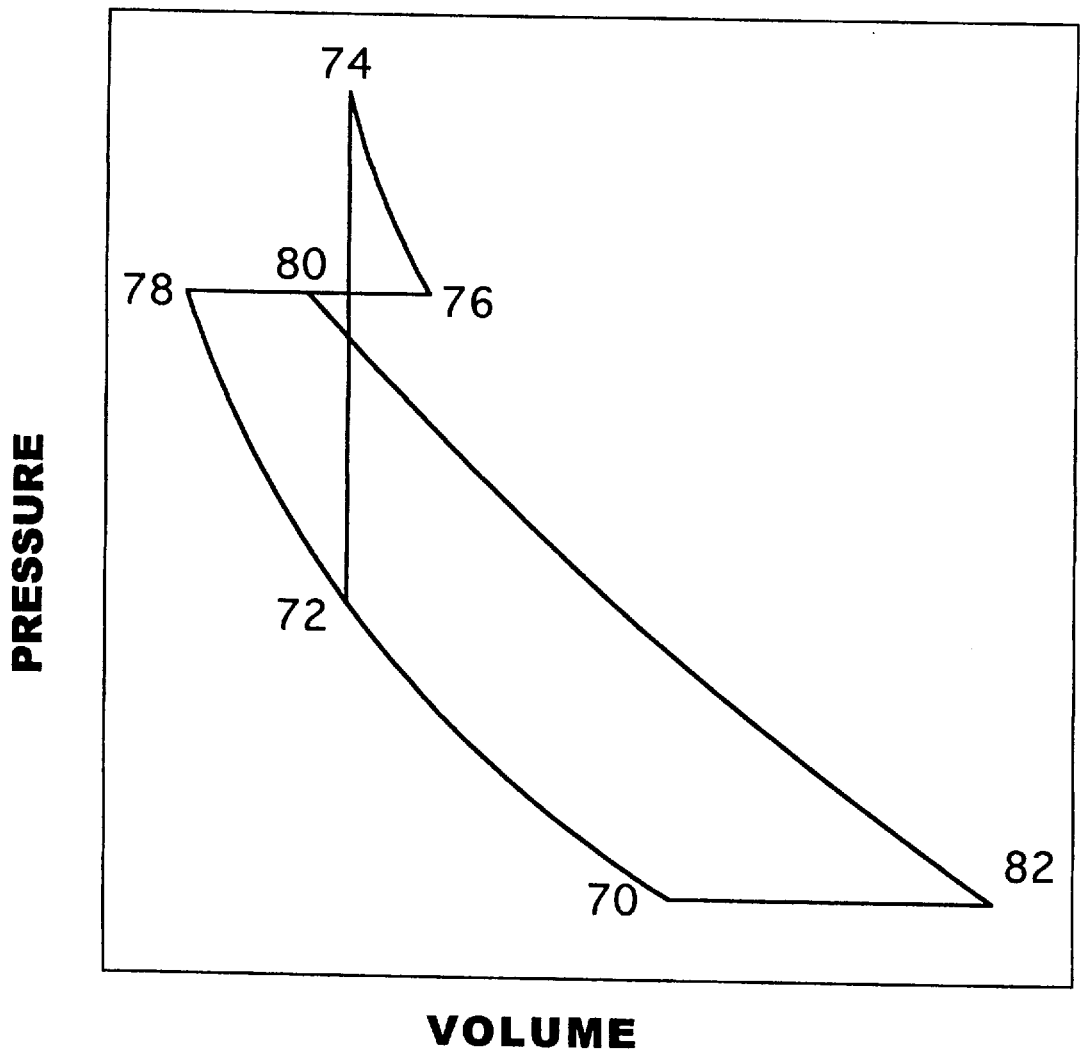
FIG. 8 illustrates a graph of the pressure vs. volume for a high pressure turbine cycle according to the present invention.

FIG. 8 illustrates a pressure volume diagram that is applicable to the high pressure cycle described above. The air enters at a first pressure and volume, shown at 70, and is compressed isentropically to a second pressure and volume, shown at 72. At this point, approximately one-half of the air is mixed with fuel and explodes to a high pressure, shown at 74. The pressure wave formed expands isentropically and the pressure decreases to a lower pressure and greater volume, shown at 76.

The energy of expansion is approximately equal to the energy required to compress the air from the pressure and volume shown at 72 to the pressure and volume shown at 78. This results in an intermediate pressure corresponding to the pressure shown at 80 and 76.

When the hot gas mixes at the pressure and volume shown at 76, with the air at the pressure and volume shown at 78, they end up at a specific pressure and volume shown at 80. From the pressure and volume of the gases shown at 80, the gasses expand to approximately atmospheric pressure, shown at 82, and eventually reduce in specific volume back to the volume shown at 70, external to the system. The temperature at the pressure and volume shown at 74 can be much higher than the temperature of the gas that enters the gas turbine because after expansion from the volume shown at 74 to the volume shown at 76, and mixing with the compressed air shown at 80, the temperature of the gas is much lower. Therefore, the effective explosion temperature (or combustion temperature of the fuel/air mixture) is significantly higher than the temperature of the pressurized gas that contacts the turbine blades. This then makes use of the potential of operating the combustion system at much higher combustion temperatures than is currently possible with a turbine operating on the Brayton Cycle, because the temperature of the pressurized gas contacting the turbine blades is lower than the combustion temperature.

The rotary valve illustrated in FIG. 9 has 3 holes, shown at 43. The rotary valve illustrated in FIG. 10 has 5 holes, shown at 45. The circles represent the location of the holes in the stationary plate with one hole representing the inlet to the combustion chamber and the other hole representing the inlet to the air compression chamber.

Preferably, the rotary valve has holes aligned whereby the valve 46 is open when the valve 44 is closed, and the valve 44 is open when the valve 46 is closed. For example, if the valve 46 and the valve 44 are placed in line with the central axis of the rotary valve, as shown in FIG. 5, the rotary valve should have an odd number of holes so that valves 46 and 44 are not open at the same time.

Since the explosion can reach a very high temperature, it may be necessary to cool the walls of the chamber. For example, in FIG. 5, a cooling jacket is shown at 51, that can be used to cool the explosion chamber portion of the combustion chamber. Optionally, water-cooled walls can be used for the entire combustion chamber if desired.

Figure 11:
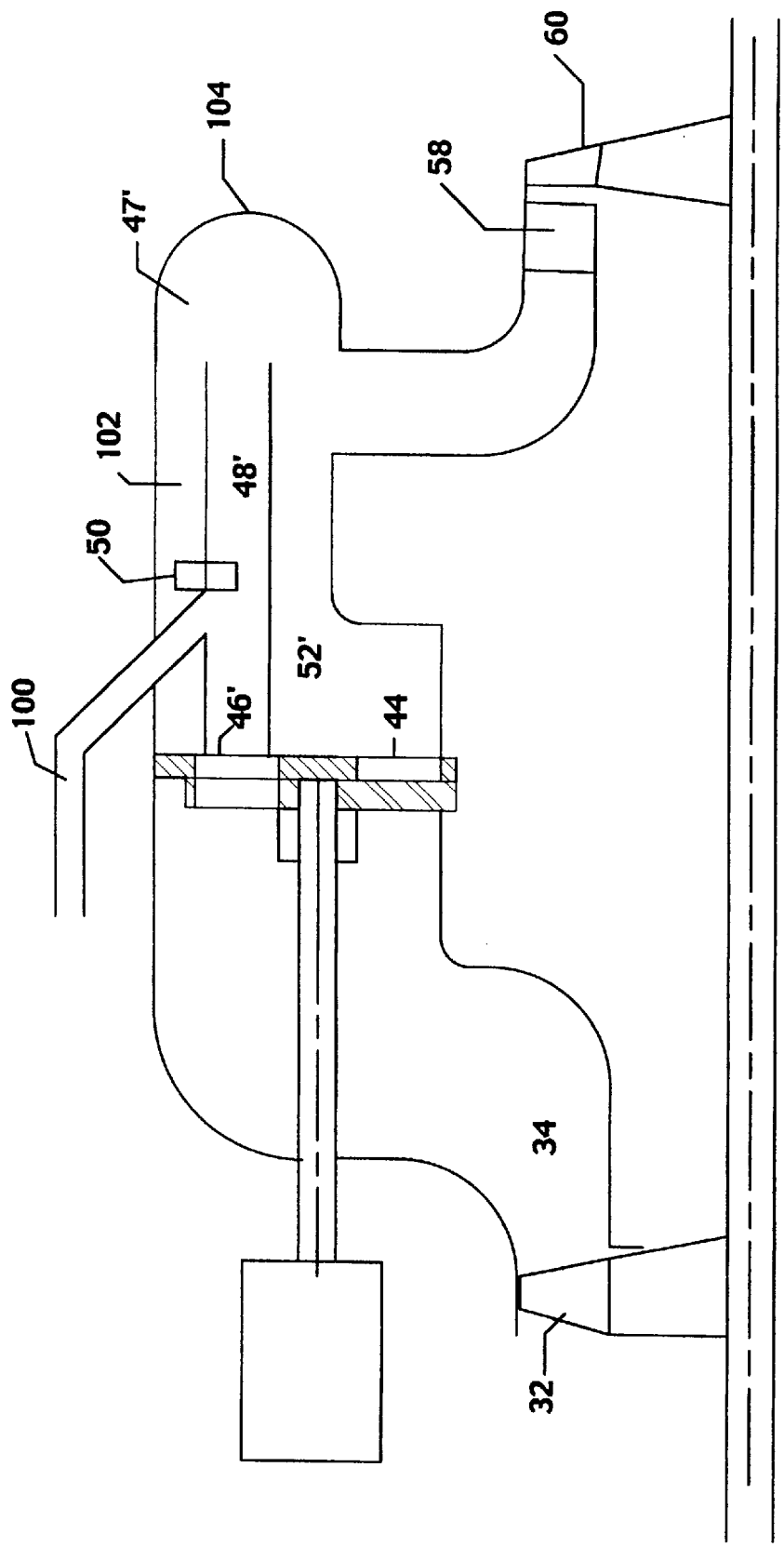
FIG. 11 illustrates a schematic diagram of an engine utilizing a high pressure cycle according to the present invention.

The combustion chamber shown in FIG. 5 utilizes a mixture of fuel/air. FIG. 11 illustrates a cross-sectional view of a turbine engine similar to that shown in FIG. 5, with the following modifications. In the turbine shown in FIG. 11, fuel is not introduced into the air chamber preceding the combustion chamber. Instead, air is introduced to combustion chamber 47' through the valve shown at 46'. Fuel is introduced into the combustion chamber through the fuel inlet shown at 100. The fuel mixes with the air in the explosion chamber portion of the combustion chamber, shown generally at 48'.

When using the combustion chamber shown in FIG. 11, the fuel injection should alternate in tune with the air inlet valve to the chamber. The fuel injection can be timed with an injection pump, if liquid fuel, or with a valve, if gaseous fuel, so that the fuel enters at approximately the same time as the air enters through valve 46.

FIG. 11 shows an optional annular space around the explosion chamber, shown at 102. This annular air space allows the compressed air in the air compression chamber to help cool the wall of the explosion chamber. However, since the explosion temperature can be high, further cooling of the explosion chamber wall may be desired.

Figure 12:
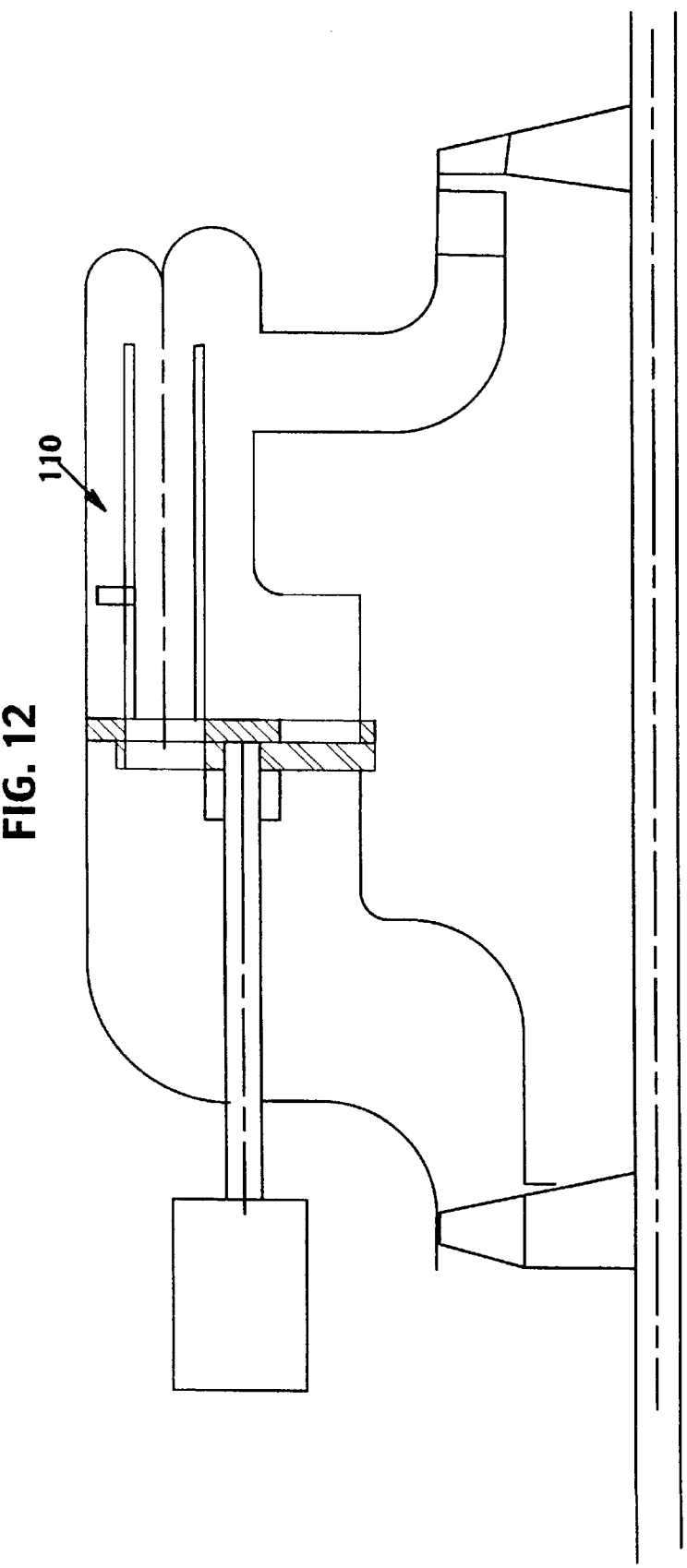
FIG. 12 illustrates a schematic diagram of an engine utilizing a high pressure cycle according to the present invention.

As shown in FIG. 11, the pressure wave travels to the end of the explosion chamber, turns, and travels toward the air compression chamber, shown generally at 52'. The spherical end, shown at 104, may cause a reflection of the pressure wave and disrupt the single frequency resonating pressure wave in the combustion chamber. This undesirable reflection could be avoided, for example, by using the U tube design shown in FIGS. 5 or 12, or a straight tube as the combustion chamber. FIG. 12 illustrates an annular space, shown at 110 around the combustion chamber. The two curves at the right hand end of the tube serve to deflect the pressure wave smoothly without an intermediate reflection, such as shown in FIG. 12.

The pressurized gas outlet, shown at 58, to the turbine, shown at 60, is closer to the air compression chamber 52' than the explosion chamber 48'. As discussed previously, the high temperature exploding air/fuel mixture compression wave has a higher acoustic velocity, and therefore in the same time travels farther than the lower temperature compression wave in the air compression chamber. Therefore, the outlet to the turbine should not be at one-half the total length of the chamber but should be closer to the air compression end, when a substantially constant pressure is desired and when using a combustion chamber having a length equal to one-half wavelength of the pressure wave.

Although it is possible to have the fuel injected separately into the explosion chamber, usually it is more desirable to have the fuel mixed with the air prior to introducing the air and fuel to the explosion chamber. Therefore in FIG. 5, the fuel inlet 38 connects to the mixing chamber 36 and a divider plate 35 separates the air/fuel mixture from the air prior to entering the explosion chamber. This scheme is usually more desirable than having the fuel injected directly into the explosion chamber for the following reasons:

(1) The air/fuel mixture is usually more uniformly mixed compared to fuel injection because the air/fuel mixture has time to mix thoroughly before the explosion occurs.

(2) The ignition of the air/fuel mixture can be more easily generated by the pressure wave itself than when using fuel injection. Ignition via the pressure wave usually provides a more substantially constant volume explosion than is possible when using a spark plug to ignite the fuel. Constant volume explosion improves the theoretical efficiency of the explosion chamber system.

(3) By having the air/fuel thoroughly mixed before the explosion, the explosion temperatures can be more uniform than when using a flame propagation created by a spark plug. This is desirable because the variation of temperature will be considerably less than that when flame propagation occurs. This has the effect of reducing formation of nitrogen oxides and other undesirable combustion by-products.

A problem with mixing the fuel and air prior to entering the explosion chamber may be that the air temperature leaving the compressor could be too high, which can lead to undesirable combustion in the mixing chamber. This could be prevented by intercooling the air going through the air compressor so that the temperature of the air leaving the air compressor is low enough that detonation will not occur in the mixing chamber.

In the Otto Cycle used in automobile engines, where fuel and air are mixed before compression, the limiting value of compression ratio is approximately 8:1 to 10:1, corresponding to a pressure ratio of approximately 25 to 1, to avoid detonation. By intercooling air as it passes through the compressor, it is possible to limit the temperature of the air entering the mixing chamber to avoid detonation. This makes it possible to use higher pressure ratios than are normally possible with the Otto Cycle used in the automobile engine. If the mixture is then ignited by the pressure wave returning from the compression end of the combustion chamber, the explosion occurs throughout the mixture and can reach a higher pressure than is possible if it occurs by flame propagation. In other words, by intercooling the air compressor significantly higher pressure ratios can be used while mixing the air and fuel before introducing them into the explosion chamber.

The present invention provides a remarkable advantage because use of the detonation characteristics of fuel are utilized, rather than attempting to suppress the detonation characteristics as is usually done in conventional automobile engines.

In FIG. 8, the temperature of the combustion gas at point 74 can be much higher than the temperature of the pressurized gas that enters the gas turbines because after expansion from 74 to 76, the combustion gas is mixed with the compressed gas at 78 to form a pressurized gas. The temperature of the pressurized gas is less than the temperature of the combustion gas. Therefore, the effective burning temperature can be much higher than the temperature of the pressurized gas that enters the gas turbine. This then makes use of the potential of operating the system at much higher temperatures than is currently possible with a gas turbine operating on the Brayton Cycle.

Performance values for the high pressure cycle according to the present invention are shown in the following Table 2. Table 3 illustrates the equations used for determining the performance values shown in Table 2. The calculations are based on what is considered to be the air standard cycle with constant mass flow through the system, and no addition of mass for the fuel, constant specific heats throughout the cycle and other possible operating conditions.

TABLE 2

| A | | B | C | D | E | F | G |
|---|---|---|---|---|---|---|---|
| 1 | P2/P1 | 32 | 32 | 32 | 32 | 32 | 32 |
| 2 | T1 | 520 | 520 | 400 | 460 | 460 | 460 |
| 3 | P1/J | 2.7201 | 2.7201 | 2.7201 | 2.7201 | 2.7201 | 2.7201 |
| 4 | T3 | 4000 | 4000 | 4000 | 4000 | 4000 | 4000 |
| 5 | EFF. COMP. | 1 | 0.9 | 0.9 | 0.9 | 0.9 | 0.9 |
| 6 | COOL FACT. | 1 | 1 | 1 | 1 | 0.9 | 0.8 |
| 7 | N/(N − 1) CO | 3.463 | 3.1167 | 3.1167 | 3.1167 | 3.463 | 3.895875 |
| 8 | (N − 1)/N CO | 0.288766965 | 0.320852 | 0.320852 | 0.320852 | 0.288767 | 0.256682 |
| 9 | N COMP | 1.406008932 | 1.472434 | 1.472434 | 1.472434 | 1.406009 | 1.345319 |
| 10 | EFF TURB | 1 | 0.9 | 0.9 | 0.9 | 0.9 | 0.9 |
| 11 | N/(N − 1) TU | 3.463 | 3.847778 | 3.847778 | 3.847778 | 3.847778 | 3.847778 |
| 12 | (N − 1)/N TU | 0.288766965 | 0.25989 | 0.25989 | 0.25989 | 0.25989 | 0.25989 |
| 13 | N TURB | 1.406008932 | 1.351151 | 1.351151 | 1.351151 | 1.351151 | 1.351151 |
| 14 | T2/T1 | 2.720430224 | 3.0404 | 3.0404 | 3.0404 | 2.72043 | 2.434134 |
| 15 | T2 | 1414.623716 | 1581.008 | 1216.16 | 1398.584 | 1251.398 | 1119.702 |
| 16 | P3/P2 | 2.827607054 | 2.530032 | 3.289041 | 2.860036 | 3.196425 | 3.57238 |
| 17 | P3/P1 | 90.48342574 | 80.96102 | 105.2493 | 91.52115 | 102.2856 | 114.3162 |
| 18 | V1/V2 | 11.76284535 | 10.52493 | 10.52493 | 10.52493 | 11.76285 | 13.14636 |
| 19 | V1 | 13.089 | 13.089 | 10.06846 | 11.57873 | 11.57873 | 11.57873 |
| 20 | V2 | 1.112740975 | 1.243618 | 0.95663 | 1.100124 | 0.984348 | 0.880756 |
| 21 | X = V3/V2 | 0.5 | 0.509 | 0.573 | 0.543 | 0.568 | 0.587 |
| 22 | (1 − X)/X | 1 | 0.964637 | 0.745201 | 0.841621 | 0.760563 | 0.703578 |
| 23 | V3 | 0.556370488 | 0.633002 | 0.548149 | 0.597367 | 0.55911 | 0.517004 |
| 24 | P4/P2 | 2.088337066 | 1.908258 | 2.553853 | 2.186671 | 2.475192 | 2.797871 |
| 25 | P4/P3 | 0.738552785 | 0.754243 | 0.776473 | 0.764561 | 0.774362 | 0.783195 |
| 26 | P4/P1 | 66.8267861 | 61.06424 | 81.72331 | 69.97348 | 79.20614 | 89.53187 |
| 27 | P4 | 982.3537557 | 897.6444 | 1201.338 | 1028.61 | 1164.33 | 1316.118 |
| 28 | T4/T2 | 1.236967851 | 1.205169 | 1.310986 | 1.253515 | 1.299195 | 1.345996 |
| 29 | T4C | 1749.844058 | 1905.382 | 1594.369 | 1753.145 | 1625.81 | 1507.114 |
| 30 | T4/T3 EXPLO | 0.916196417 | 0.921776 | 0.929541 | 0.9254 | 0.928811 | 0.931858 |
| 31 | T4E | 3664.785666 | 3687.102 | 3718.164 | 3701.599 | 3715.242 | 3727.431 |
| 32 | T4 | 2707.314862 | 2812.277 | 2811.304 | 2811.156 | 2812.607 | 2810.44 |
| 33 | V4 | 1.019738658 | 1.159236 | 0.86589 | 1.011235 | 0.893822 | 0.790128 |
| 34 | HEAT IN | 217.9472207 | 207.5916 | 268.9407 | 238.1591 | 263.2193 | 285.0579 |
| 35 | T5/T4 | 0.297176567 | 0.343472 | 0.31842 | 0.331528 | 0.321019 | 0.310957 |
| 36 | T5 | 804.5505359 | 965.9385 | 895.1744 | 931.9758 | 902.901 | 873.9255 |
| 37 | HEAT OUT | 67.46693206 | 105.732 | 117.4058 | 111.9055 | 105.0118 | 98.14172 |
| 38 | WORK | 150.4802886 | 101.8596 | 151.5348 | 126.2537 | 158.2075 | 186.9162 |
| 39 | EFF. | 0.690443715 | 0.490673 | 0.563451 | 0.530123 | 0.601048 | 0.655713 |
| 40 | V5 | 20.25135188 | 24.31365 | 22.53245 | 23.45878 | 22.72693 | 21.99759 |

TABLE 2-continued

|    |              |             |          |          |          |          |          |
|----|--------------|-------------|----------|----------|----------|----------|----------|
| 41 | WORK COM     | 150.8664994 | 170.8533 | 131.4256 | 151.1395 | 148.2876 | 145.3359 |
| 42 | WORK EXP     | 320.8768874 | 324.003  | 336.2501 | 329.7661 | 335.123  | 339.8275 |
| 43 | WORK EXH     | 19.48231334 | 30.53217 | 33.90328 | 32.31491 | 30.32422 | 28.34034 |
| 44 | NET WORK     | 150.5280747 | 122.6175 | 170.9212 | 146.3117 | 156.5112 | 166.1512 |
| 45 | EFF. BY WORK | 0.69066297  | 0.590667 | 0.635535 | 0.614344 | 0.594604 | 0.582868 |

|    | H         | I         | J         | K         | L         | M         | N         |
|----|-----------|-----------|-----------|-----------|-----------|-----------|-----------|
| 1  | 32        | 32        | 32        | 32        | 32        | 32        | 32        |
| 2  | 460       | 460       | 460       | 460       | 460       | 520       | 520       |
| 3  | 2.7201    | 2.7201    | 2.7201    | 2.7201    | 2.7201    | 2.7201    | 2.7201    |
| 4  | 4000      | 4000      | 4000      | 4000      | 4000      | 4040      | 4400      |
| 5  | 0.9       | 0.9       | 0.9       | 0.9       | 0.9       | 0.9       | 0.9       |
| 6  | 0.7       | 0.6       | 0.5       | 0.4       | 0.3       | 1         | 1         |
| 7  | 4.452429  | 5.1945    | 6.2334    | 7.79175   | 10.389    | 3.1167    | 3.1167    |
| 8  | 0.224597  | 0.192511  | 0.160426  | 0.128341  | 0.096256  | 0.320852  | 0.320852  |
| 9  | 1.289651  | 1.238407  | 1.19108   | 1.147237  | 1.106508  | 1.472434  | 1.472434  |
| 10 | 0.9       | 0.9       | 0.9       | 0.9       | 0.9       | 0.9       | 0.9       |
| 11 | 3.847778  | 3.847778  | 3.847778  | 3.847778  | 3.847778  | 3.847778  | 3.847778  |
| 12 | 0.25989   | 0.25989   | 0.25989   | 0.25989   | 0.25989   | 0.25989   | 0.25989   |
| 13 | 1.351151  | 1.351151  | 1.351151  | 1.351151  | 1.351151  | 1.351151  | 1.351151  |
| 14 | 2.177968  | 1.94876   | 1.743674  | 1.560171  | 1.39598   | 3.0404    | 3.0404    |
| 15 | 1001.865  | 896.4297  | 802.0901  | 717.6788  | 642.1508  | 1581.008  | 1581.008  |
| 16 | 3.992553  | 4.462146  | 4.986971  | 5.573524  | 6.229066  | 2.555332  | 2.783035  |
| 17 | 127.7617  | 142.7887  | 159.5831  | 178.3528  | 199.3301  | 81.77063  | 89.05712  |
| 18 | 14.6926   | 16.4207   | 18.35205  | 20.51057  | 22.92296  | 10.52493  | 10.52493  |
| 19 | 11.57873  | 11.57873  | 11.57873  | 11.57873  | 11.57873  | 13.089    | 13.089    |
| 20 | 0.788066  | 0.70513   | 0.630923  | 0.564525  | 0.505115  | 1.243618  | 1.243618  |
| 21 | 0.603     | 0.617     | 0.628     | 0.638     | 0.646     | 0.5       | 0.436     |
| 22 | 0.658375  | 0.620746  | 0.592357  | 0.567398  | 0.547988  | 1         | 1.293578  |
| 23 | 0.475204  | 0.435065  | 0.39622   | 0.360167  | 0.326304  | 0.621809  | 0.542218  |
| 24 | 3.162952  | 3.576572  | 4.040154  | 4.564795  | 5.153344  | 1.911016  | 1.944272  |
| 25 | 0.792213  | 0.801536  | 0.810142  | 0.819014  | 0.827306  | 0.747854  | 0.698616  |
| 26 | 101.2145  | 114.4503  | 129.2849  | 146.0734  | 164.907   | 61.15251  | 62.21671  |
| 27 | 1487.853  | 1682.419  | 1900.489  | 2147.279  | 2424.133  | 898.9419  | 914.5857  |
| 28 | 1.394526  | 1.444912  | 1.496676  | 1.55039   | 1.205672  | 1.205672  | 1.211694  |
| 29 | 1397.128  | 1295.262  | 1200.469  | 1112.682  | 1031.071  | 1906.177  | 1915.698  |
| 30 | 0.934944  | 0.938108  | 0.941006  | 0.943971  | 0.946721  | 0.919514  | 0.901604  |
| 31 | 3739.776  | 3752.434  | 3764.025  | 3775.883  | 3786.884  | 3714.836  | 3967.06   |
| 32 | 2809.744  | 2811.337  | 2810.382  | 2811.804  | 2811.026  | 2810.507  | 2810.092  |
| 33 | 0.698755  | 0.618296  | 0.547165  | 0.484523  | 0.429114  | 1.156834  | 1.136879  |
| 34 | 304.8078  | 322.8526  | 338.5973  | 353.0688  | 365.7222  | 207.293   | 207.223   |
| 35 | 0.301201  | 0.291733  | 0.282637  | 0.27381   | 0.265315  | 0.343343  | 0.341807  |
| 36 | 846.2989  | 820.1596  | 794.3183  | 769.8996  | 745.8858  | 964.968   | 960.5091  |
| 37 | 91.59146  | 85.39383  | 79.26687  | 73.47719  | 67.78352  | 105.5019  | 104.4447  |
| 38 | 213.2163  | 237.4588  | 259.3304  | 279.5916  | 297.9386  | 101.7911  | 102.7783  |
| 39 | 0.699551  | 0.735502  | 0.765896  | 0.79189   | 0.814658  | 0.491049  | 0.495979  |
| 40 | 21.3022   | 20.64425  | 19.9938   | 19.37915  | 18.7747   | 24.28922  | 24.17699  |
| 41 | 142.3185  | 139.2644  | 136.1977  | 133.1392  | 130.1056  | 170.8533  | 170.8533  |
| 42 | 344.5533  | 349.4198  | 353.787   | 358.3217  | 362.4518  | 323.8626  | 324.5722  |
| 43 | 26.44881  | 24.65911  | 22.88982  | 21.21793  | 19.57376  | 30.46572  | 30.16044  |
| 44 | 175.786   | 185.4963  | 194.6994  | 203.9646  | 212.7725  | 122.5435  | 123.5585  |
| 45 | 0.576711  | 0.574554  | 0.575018  | 0.577691  | 0.581787  | 0.591161  | 0.596259  |

TABLE 3

|    | A            | B                  | C                  |
|----|--------------|--------------------|--------------------|
| 1  | P2/P1        | 32                 | 32                 |
| 2  | T1           | 520                | 520                |
| 3  | P1/J         | 2.7201             | 2.7201             |
| 4  | T3           | 4000               | 4000               |
| 5  | EFF. COMP    | 1                  | 0.9                |
| 6  | COOL FACT.   | 1                  | 1                  |
| 7  | N/(N − 1) CO | = 3.463*B5/B6      | = 3.463*C5/C6      |
| 8  | (N − 1)/N CO | = 1/B7             | = 1/C7             |
| 9  | N COMP       | = 1/(B7 − 1) + 1   | = 1/(C7 − 1) + 1   |
| 10 | EFF TURB     | 1                  | 0.9                |
| 11 | N/(N − 1)TU  | = 3.463/B10        | = 3.463/C10        |
| 12 | (N − 1)/N TU | = 1/B11            | = 1/C11            |
| 13 | N TURB       | = 1/(B11 − 1) + 1  | = 1/(C11 − 1) + 1  |
| 14 | T2/T1        | = B1^B8            | = C1^C8            |
| 15 | T2           | = B2*B14           | = C2*C14           |
| 16 | P3/P2        | = B4/B15           | = C4/C15           |
| 17 | P3/P1        | = B16*B1           | = C16*C1           |
| 18 | V1/V2        | = B1^(1/B9)        | = C1^(1/C9)        |

TABLE 3-continued

| | | | |
|---|---|---|---|
| 19 | V1 | = 13.089*B2/520 | = 13.089*C2/520 |
| 20 | V2 | = B19/B18 | = C19/C18 |
| 21 | X = V3/V2 | 0.5 | 0.509 |
| 22 | (1 − X)/X | = (1 − B21)/B21 | = (1 − C21)/C21 |
| 23 | V3 | = B20*B21 | = C20*C21 |
| 24 | P4/P2 | = ((B16 + B22)/(B22 + B16^0.711233))^3.463 | = ((C16 + C22)/(C22 + C |
| 25 | P4/P3 | = B24/B16 | = C24/C16 |
| 26 | P4/P1 | = B1*B24 | = C1*C24 |
| 27 | P4 | = B26*14.7 | = C26*14.7 |
| 28 | T4/T2 | = B24^0.2888 | = C24^0.2888 |
| 29 | T4C | = B28*B15 | = C28*C15 |
| 30 | T4/T3 EXPLO | = B25^0.2888 | = C25^0.2888 |
| 31 | T4E | = B4*B30 | = C4*C30 |
| 32 | T4 | = B31*B21 + B29*(1−B21) | = C31*C21 + C29*(1−C2 |
| 33 | V4 | = 53.282*B32/B27/144 | = 53.282*C32/C27/144 |
| 34 | HEAT IN | = (B4−B15)*0.1686*B21 | = (C4−C15)*0.1686*C2 |
| 35 | T5/T4 | = 1/(B1*B24)^B12 | = 1/(C1*C24)^C12 |
| 36 | T5 | = B32*B35 | = C32*C35 |
| 37 | HEAT OUT | = 0.2371*(B36 − B2) | = 0.2371*(C36 − C2) |
| 38 | WORK | = B34−B37 | = C34−C37 |
| 39 | EFF | = B38/B34 | = C38/C34 |
| 40 | V5 | = 53.282*B36/14.7/144 | = 53.282*C36/14.7/144 |
| 41 | WORK COM | = 2.7201*B19/(B9 − 1)/B5*(B1^B8 − 1) | = 2.7201*C19/(C9 − 1)C |
| 42 | WORK EXP | = B2*B33*B10/5.40417/(B13 − 1)*(1 − 1/B26^B12) | = C27*C33*C10/5.404 |
| 43 | WORK EXH | = 2.7201*(B40 − B19) | = 2.7201*(C40 − C19) |
| 44 | NET WORK | = B42−B41−B43 | = C42−C41−C43 |
| 45 | EFF. BY WORK | = B44/B34 | = C44/C34 |

| | D | E | F |
|---|---|---|---|
| 1 | 32 | 32 | 32 |
| 2 | 400 | 460 | 460 |
| 3 | 2.7201 | 2.7201 | 2.7201 |
| 4 | 4000 | 4000 | 4000 |
| 5 | 0.9 | 0.9 | 0.9 |
| 6 | 1 | 1 | 0.9 |
| 7 | = 3.463*D5/D6 | = 3.463*E5/E6 | = 3.463*F5/F6 |
| 8 | = 1/D7 | = 1/E7 | = 1/F7 |
| 9 | = 1/(D7 − 1) + 1 | = 1/(E7 − 1) + 1 | = 1/(F7 − 1) + 1 |
| 10 | 0.9 | 0.9 | 0.9 |
| 11 | = 3.463/D10 | = 3.463/E10 | = 3.463/F10 |
| 12 | = 1/D11 | = 1/E11 | = 1/F11 |
| 13 | = 1/(D11 − 1) + 1 | = 1/(E11 − 1) + 1 | = 1/(F11 − 1) + 1 |
| 14 | = D1^D8 | = E1^E8 | = F1^F8 |
| 15 | = D2*D14 | = E2*E14 | = F2*F14 |
| 16 | = D4/D15 | = E4/E15 | = F4/F15 |
| 17 | = D16*D1 | = E16*E1 | = F16*F1 |
| 18 | = D1^(1/D9) | = E1^(1/E9) | = F1^(1/F9) |
| 19 | = 13.089*D2/520 | = 13.089*E2/520 | = 13.089*F2/520 |
| 20 | = D19/D18 | = E19/E18 | = F19/F18 |
| 21 | 0.573 | 0.543 | 0.568 |
| 22 | = (1−D21)/D21 | = (1−E21)/E21 | = (1−F21)/F21 |
| 23 | = D20*D21 | = E20*E21 | = F20*F21 |
| 24 | = ((D16 + D22)/(D22 + D | = ((E16 + E22)/(E22 + E1 | = ((F16 + F22)/(F22 + F1 |
| 25 | = D24/D16 | = E24/E16 | = F24/F16 |
| 26 | = D1*D24 | = E1*E24 | = F1*F24 |
| 27 | = D26*14.7 | = E26*14.7 | = F26*14.7 |
| 28 | = D24^0.2888 | = E24^0.2888 | = F24^0.2888 |
| 29 | = D28*D15 | = E28*E15 | = F28*F15 |
| 30 | = D25^0.2888 | = E25^0.2888 | = F25^0.2888 |
| 31 | = D4*D30 | = E4*E30 | = F4*F30 |
| 32 | = D31*D21 + D29*(1−D2 | = E31*E21 + E29*(1−E2 | = F31*F21 + F29*(1−F2 |
| 33 | = 53.282*D32/D27/144 | = 53.282*E32/E27/144 | = 53.282*F32/F27/144 |
| 34 | = (D4−D15)*0.1686*D2 | = (E4−E15)*0.1686*E2 | = (F4−F15)*0.1686*F2 |
| 35 | = 1/(D1*D24)^D12 | = 1/(E1*E24)^E12 | = 1/(F1*F24)^F12 |
| 36 | = D32*D35 | = E32*E35 | = F32*F35 |
| 37 | = 0.2371*(D36 − D2) | = 0.2371*(E36 − E2) | = 0.2371*(F36 − F2) |
| 38 | = D34−D37 | = E34−E37 | = F34−F37 |
| 39 | = D38/D34 | = E38/E34 | = F38/F34 |
| 40 | = 53.282*D36/14.7/14 | = 53.282*E36/14.7/14 | = 53.282*F36/14.7/14 |
| 41 | = 2.7201*D19/(D9 − 1)/D | = 2.7201*E19/(E9 − 1)/E | = 2.7201*F19/(F9 − 1)/F |
| 42 | = D27*D33*D10/5.404 | = E27*E33*E10/5.404 | = F27*F33*F10/5.4041 |
| 43 | = 2.7201*(D40 − D19) | = 2.7201*(E40 − E19) | = 2.7201*(F40 − F19) |
| 44 | = D42−D41−D43 | = E42−E41−E43 | = F42−F41−F43 |
| 45 | = D44/D34 | = E44/E34 | = F44/F34 |

TABLE 3-continued

| | G | H | I |
|---|---|---|---|
| 1 | 32 | 32 | 32 |
| 2 | 460 | 460 | 460 |
| 3 | 2.7201 | 2.7201 | 2.7201 |
| 4 | 4000 | 4000 | 4000 |
| 5 | 0.9 | 0.9 | 0.9 |
| 6 | 0.8 | 0.7 | 0.6 |
| 7 | = 3.463*G5/G6 | = 3.463*H5/H6 | = 3.463*I5/I6 |
| 8 | = 1/G7 | = 1/H7 | = 1/I7 |
| 9 | = 1/(G7 − 1) + 1 | = 1/(H7 − 1) + 1 | = 1/(I7 − 1) + 1 |
| 10 | 0.9 | 0.9 | 0.9 |
| 11 | = 3.463/G10 | = 3.463/H10 | = 3.463/I10 |
| 12 | = 1/G11 | = 1/H11 | = 1/I11 |
| 13 | = 1/(G11 − 1) + 1 | = 1/(H11 − 1) + 1 | = 1/(I11 − 1) + 1 |
| 14 | = G1^G8 | = H1^H8 | = I1^I8 |
| 15 | = G2*G14 | = H2*H14 | = I2*I14 |
| 16 | = G4/G15 | = H4/H15 | = I4/I15 |
| 17 | = G16*G1 | = H16*H1 | = I16*I1 |
| 18 | = G1^(1/G9) | = H1^(1/H9) | = I1^(1/I9) |
| 19 | = 13.089*G2/520 | = 13.089*H2/520 | = 13.089*I2/520 |
| 20 | = G19/G18 | = H19/H18 | = I19/I18 |
| 21 | 0.587 | 0.603 | 0.617 |
| 22 | = (1-G21)/G21 | = (1-H21)/H21 | = (1-I21)/I21 |
| 23 | = G20*G21 | = H20*H21 | = I20*I21 |
| 24 | = ((G16 + G22)/(G22 + G | = ((H16 + H22)/(H22 + H | = ((I16 + I22)/(I22 + I16^ |
| 25 | = G24/G16 | = H24/H16 | = I24/I16 |
| 26 | = G1*G24 | = H1*H24 | = I1*I24 |
| 27 | = G26*14.7 | = H26*14.7 | = I26*14.7 |
| 28 | = G24^0.2888 | = H24^0.2888 | = I24^0.2888 |
| 29 | = G28*G15 | = H28*H15 | = I28*I15 |
| 30 | = G25^0.2888 | = H25^0.2888 | = I25^0.2888 |
| 31 | = G4*G30 | = H4*H30 | = I4*I30 |
| 32 | = G31*G21 + G29*(1 − G | = H31*H21 + H29*(1 − H2 | = I31*I21 + I29*(1 − I21) |
| 33 | = 53.282*G32/G27/144 | = 53.282*H32/H27/144 | = 53.282*I32/I27/144 |
| 34 | = (G4–G15)*0.1686*G2 | = (H4–H15)*0.1686*H2 | = (I4–I15)*0.1686*I21 |
| 35 | = 1/(G1*G24)^G12 | = 1/(H1*H24)^H12 | = 1/(I1*I24)^I12 |
| 36 | = G32*G35 | = H32*H35 | = I32*I35 |
| 37 | = 0.2371*(G36 − G2) | = 0.2371*(H36 − H2) | = 0.2371*(I36 − I2) |
| 38 | = G34–G37 | = H34–H37 | = I34–I37 |
| 39 | = G38/G34 | = H38/H34 | = I38/I34 |
| 40 | = 53.282*G36/14.7/14 | = 53.282*H36/14.7/14 | = 53.282*I36/14.7/144 |
| 41 | = 2.7201*G19/G9 − 1)/G | = 2.7201*H19/H9 − 1)/H | = 2.7201*I19/I9 − 1)/I5* |
| 42 | = G27*G33*G10/5.404 | = H27*H33*H10/5.404 | = I27*I33*I10/5.40417/ |
| 43 | = 2.7201*(G40 − G19) | = 2.7201*(H40 − H19) | = 2.7201*(I40 − I19) |
| 44 | = G42-G41-G43 | = H42-H41-H43 | = I42-I41-I43 |
| 45 | = G44/G34 | = H44/H34 | = I44/I34 |

In Table 2:

Row 1 shows the pressure ratio of 32 through the air compressor.

Row 2 shows the inlet temperature in degrees Rankine.

Row 3 shows the value of 14.7 psia×144/778.2. T3 is the peak temperature reached in the explosion in degrees Rankine, and should be achievable. Actually, if stoichiometric combustion is achieved, then the values for T3 should be higher than 4000° R.

Row 5 shows compressor polytropic efficiency.

Row 6 shows a cooling factor which represents intercooling with the number 1 being the case with no intercooling in the compressor.

Row 7 represents the value of N/(N−1) where N is the equivalent ratio of specific heat at constant pressure to the specific heat at constant volume when compression is polytropic rather than isentropic, and the value shown is the value that occurs with the polytropic efficiency and cooling factor shown.

Row 8 is the inverse of Row 7.

Row 9 is the ratio of specific heats and the equivalent value shown for the actual polytropic exponent, or the exponent as affected by continual process intercooling.

Row 10 shows polytropic efficiency of expansion in the turbine.

Rows 11, 12 and 13 correspond to Row 7, 8 and 9, but as calculated for the expansion curve for the turbine.

Row 14 is the ratio of compressor discharge temperature to compressor inlet temperature.

Row 15 is the compressor discharge temperature in degrees Rankine.

Row 16 is the ratio for the pressure at the peak of the explosion to the pressure at the outlet from the compressor.

Row 17 shows the ratio of peak pressure in the explosion to atmospheric inlet pressure. Note that the values of P3/P1 go as high as 199 in column L. Currently diesel engine peak cylinder pressures reach approximately this same value.

Row 18 V1/V2 is the ratio of inlet volume to the volume after compression in the compressor. V1 is the specific volume of air at the corresponding pressure P1 and T1. This is stated in cubic feet per pound. V2 is the specific volume after compressing in the compressor.

Row 21 X is the ratio of the volume of air entering the explosion chamber to the volume of air entering the compression chamber end of the chamber.

Row 23 V3 is the specific volume of the gas at peak explosion pressure.

Row 24 P4/P2 is the ratio of the pressure after expansion from the peak explosion pressure to the pressure leaving the compressor.

Row 25 P4/P3 is the ratio of the pressure of the mixture leaving the combustion chamber to the peak pressure of the explosion.

Row 26 P4/P1 is the expansion ratio passing through the turbine after combustion.

Row 27 P4 is the pressure at turbine inlet in lbs/square inch absolute.

Row 28 T4/T2 is the ratio of turbine inlet temperature to compressor discharge temperature.

Row 29 T4C is the temperature in the compressor end of explosion chamber in degrees Rankine.

Row 30 T4/T3 is the ratio of the temperature laving the explosion chamber to the temperature at the peak of explosion.

Row 31 T4E is the temperature of the exploding gas mixture before it mixes with the air in the opposite end of the chamber.

Row 32 T4 is the temperature of the mixture leaving the combustion chamber and entering the turbine.

In these calculations, the value of X has been adjusted whereby the value of T4 is approximately 2810° R (2350° F.) which is a usable modern turbine inlet temperature.

Row 33 V4 is the specific volume of the gas mixture as it leaves the chamber.

Row 34 the heat in is the heat input from the fuel heating the air or air fuel mixture from a temperature of T2 to a temperature of T3.

Row 35 T5/T4 is the ratio of turbine exhaust temperature to turbine inlet temperature.

Row 36 T5 is the exhaust temperature from the system in degrees Rankine.

Row 37 the heat out represents the specific heat at constant pressure times the quantity (T5−T1).

Row 38 the work output is in BTU's per pound, and is calculated from the difference between the heat input and the heat output. This work output is correct for the theoretical condition as shown in column B.

Row 39 the cycle efficiency equals the quantity item 34−item 37 divided by item 34. The efficiency calculation is correct for the theoretical case shown in column B. The efficiency is an approximation and may be slightly lower due to intercooling and inefficiency in the compression and expansion in this cycle.

Row 40 V5 is the specific volume of the gas at exhaust.

Row 41 the work of compression is calculated by the compression formula at the value of N shown on Row 9.

Row 42 the work of expansion is the work output from the turbine as calculated based on the N value shown on item 13.

Row 43 the work from the exhaust represents theoretical work that is lost as the volume at the exhaust shrinks to the volume at the inlet temperature.

Row 44 the net work equals the work of expansion item 42−item 41−item 43.

Row 45 the efficiency is simply the net work divided by item 34, the heat input.

The efficiencies shown in Table 2 do not take fully into account other losses that should be accounted for in an actual turbine, and therefore the efficiencies may be slightly lower than those shown above. Despite these additional losses not shown in the Table 2, the remarkable increase in efficiency shown in Table 2 compared to Table 1 is very significant and startling. For example, in comparing column c in Table 2 with column c in Table 1, the increase in efficiency is almost 20%. This difference is even more accentuated when using an intercooled system. For example comparing column j in Table 2 with column j in Table 1, the increase in efficiency is 22%.

The turbine and compressor polytropic efficiencies of 0.9 are rather typical of what is attained in gas turbines today.

The efficiency of the explosion process was not calculated and was assumed to be 100%. The following important factors should be noted regarding the explosion process.

1. There will be less heat loss from the combustion chamber according to the present invention than what occurs in a Diesel engine cylinder. The reason for this is that with a gas piston in the explosion chamber the walls can be much hotter than the walls in a diesel engine cylinder where lubrication is required. Therefore, the radiation or convection heat loss should be much less in the high pressure cycle according to the present invention than in a Diesel cycle.

2. There should be a very low friction loss in the present invention because compression is achieved using a compression wave instead of a piston. Furthermore, if the average velocity in the explosion chamber is at most about 200 feet per second, then friction loss becomes negligible.

3. The efficiency of a traveling pressure wave is very high. For example, a tidal wave or tsunami can travel thousands of miles across the ocean with very little diminution of energy.

4. When a detonation type of explosion is made to occur, as in the present invention, the explosion should be very close to constant volume.

In Table 2, columns D and E show the considerable improvement in efficiency and output compared to column C, which is made possible by refrigerating the inlet air to 400° R or 460° R.

Refrigerating the inlet air to the compressor, as shown on columns F through L, makes possible liquid injection intercooling. This liquid injection intercooling is made possible because refrigerating the inlet air removes the moisture from the air stream, and makes it possible to inject water and evaporate it within the compressor, thereby performing effective intercooling with very little losses.

In columns C through L, the percentage of air in the explosion process has been adjusted to allow the turbine inlet temperature, T4, to be approximately 2810° R which is a usable turbine inlet temperature in modern day turbines. Note that in both Table 1 and 2, the various degrees of intercooling maintain fairly constant cycle efficiency, but the net work output increases very greatly with more intercooling. Therefore, liquid injection intercooling and inlet refrigeration become very important factors in increasing the power output of a given size turbine.

Columns M and N show the effect of increasing the explosion temperature closer to the stoichiometric value when compared to column C. This demonstrates that the efficiency will increase with higher explosion temperatures at the same turbine inlet temperature by virtue of the fact that the X value or ratio of V3/V2 is adjusted to produce the same turbine temperature.

The peak pressure values shown on line 17 appear to be quite high. However, it should be noted that current peak pressure ratios on diesel engines are as high as 200. Therefore, these high peak pressures should be reasonably achievable.

An important factor in comparing Table 2 with Table 1 is that the gas volume introduced into the turbine shown on line 20 in the Brayton Cycle versus V4 on line 33 on table 2 shows that the volume of the gas entering the turbine is much less in Table 2 than it is in Table 1. For example, on column J which is an intercooled case, the volume entering the turbine in Table 2 is 0.547 cubic feet per lb whereas the volume of V3 on column J for the Brayton Cycle is 2.210 cubic feet per lb. This is a ratio of 4 to 1. The significance of this is that the turbine blades in the high pressure cycle according to the present invention can be approximately one-fourth of the length of turbine blades for the Brayton Cycle. A short blade length means that the turbine blade stresses are significantly lower and they will be significantly easier to cool than the longer blades for the Brayton Cycle. This in turn means that higher turbine inlet temperatures could be used, which is an important practical advantage.

An important factor in the high pressure cycle according to the present invention is that exhaust temperatures can be much lower than those generally achievable in the Brayton Cycle turbines in use today. For example, in column J line 36, the exhaust temperature from the cycle is 794° R or 334° F.

Typical exhaust temperatures from modern gas turbines range from 700° F. to 1240° F. In contrast, an exhaust temperature from a turbine engine according to the present invention is significantly lower, on the order of about 300° F. to about 500° F.

Vapor turbine cycles typically operate efficiently in the range of from 800 to 160° F. inlet temperature. Thus, the exhaust from the turbine engine according to the present invention can be used directly to drive a vapor turbine cycle.

In general, high exhaust temperatures correspond to low compressor pressure ratios, and low exhaust temperatures occur with higher pressure ratios. However, in the turbine engine according to the present invention, the exhaust pressure can also be adjusted by adjusting the amount of air being compressed in the air compression chamber. In general, the more air being mixed with and compressed by the combustion gas compression wave, the lower the exhaust temperature.

Because of the great demand for higher efficiency gas turbine cycles, it is today increasingly common practice to use a combined cycle in which the exhaust gas is used to heat a Rankine cycle system, and produce additional power and increased efficiency. Typically those cycles utilizing exhaust gas temperatures of 1100° F. require that a steam turbine cycle be used to recover the exhaust energy. This is very expensive, and high pressure steam turbines are usually not efficient. Also, high pressure steam turbines cannot economically use condensing temperatures very close to atmospheric temperature because the volume expansion ratio through such a steam turbine is extremely high.

However, if the exhaust temperature from the gas turbine is as low as 334° F., then this heat can be conveniently used in a low temperature vapor turbine cycle, using a working fluid such as isobutane. This cycle attains a significantly higher turbine efficiency than a steam turbine, and also permits utilizing condensing temperatures very close to atmospheric temperatures. This also has the significance that the heat of condensation of the water vapor in the exhaust can be recovered. Therefore, the overall cycle efficiency can be significantly higher than that for other combined cycles in use today.

Figure 13:
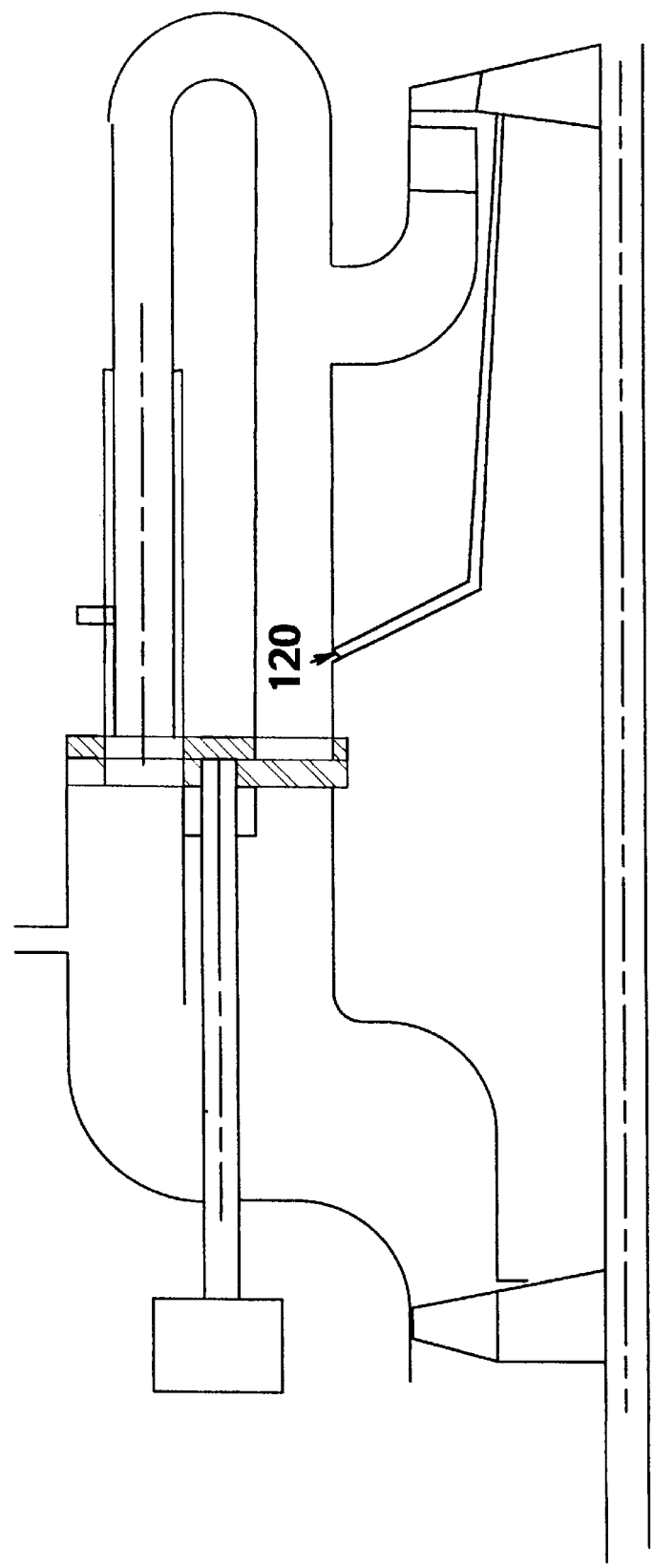
FIG. 13 illustrates a schematic diagram of an engine utilizing a high pressure cycle according to the present invention.

In gas turbine cycles in use today, it is common practice to use cooling air supplied by the compressor to be injected into the first stage turbine disk and out through holes in the turbine blades, thereby cooling the blades so that higher inlet temperatures can be used. FIG. 13 illustrates diagrammatically how this can be accomplished using the high pressure cycle according to the present invention. In order to provide air at sufficiently high pressure to force its way through the cooling passages in the turbine blades, the blade cooling air supply line, shown at 11, is located where the combustion chamber pressure varies greatly, such as near an inlet to the compression chamber. As shown in FIG. 7, the blade cooling air supply line can be located in the combustion chamber where the combustion chamber pressure approaches P3, such as between the points E4 and E5, the points R1 and E3, or the points R2 and E6. A check valve can also be installed in the line to prevent backflow into the combustion chamber. The pulsating pressure at these locations can be high enough so that pulses of cooling air are sent to the turbine blades. As pointed out above, the turbine blades can be much shorter, and therefore much easier to cool than the long turbine blades required for the Brayton Cycle system. Therefore the amount of cooling air required to cool the blades can be greatly reduced compared to a conventional gas turbine, both because less cooling air is required, and because with intercooling of the compressor, the air coming from the compression chamber is colder than it is from the ordinary gas turbine compressor discharge.

Figure 14:
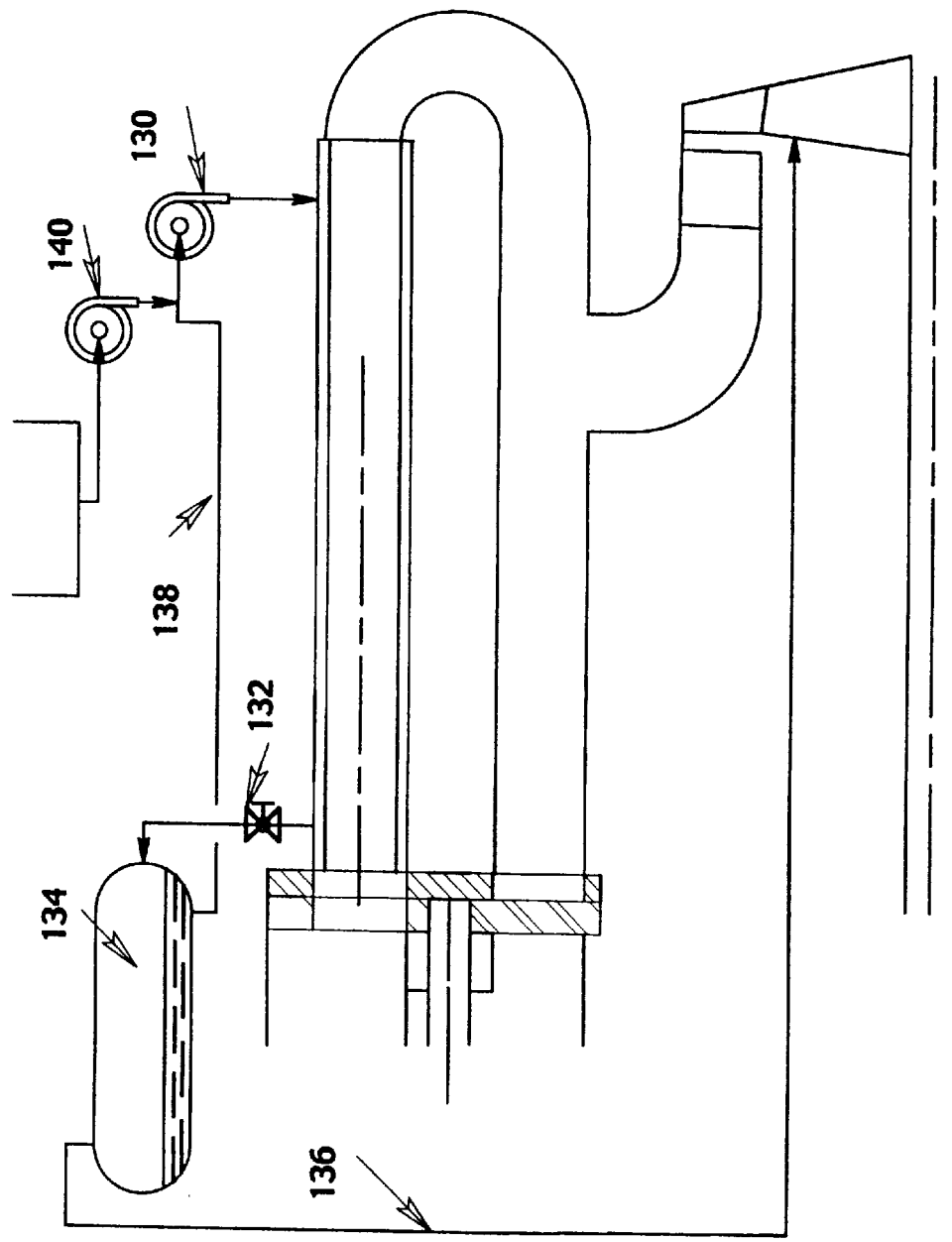
FIG. 14 illustrates a schematic diagram of an engine utilizing a high pressure cycle according to the present invention.

FIG. 14 shows an alternative blade cooling system in which steam is used to cool the turbine blades. This has several potential advantages. Steam has a higher heat transfer coefficient than air, and therefore for a given temperature in the cooling line the cooling becomes more effective. As shown in FIG. 14, steam cooling can be supplied by having the water jacket around the explosion chamber be fed with a high pressure pump, shown at 130, that keeps the water pressure above the boiling point. The high pressure water can then be expanded through a throttle valve, shown at 132, part of it will flash into steam in the high pressure flash tank shown at 134, and this steam can then be sent through the line shown at 136 to cool the turbine blades. The water at the bottom of the flash tank can be returned to the inlet of the high pressure pump using the line shown at 138. An additional water supply pump, shown at 140, can feed make up water into the water return line 138. This system is potentially more efficient than the system using air to cool the turbine blades because the heat loss from the explosion chamber is used directly to generate the steam that cools the turbine blades.

Figure 15:
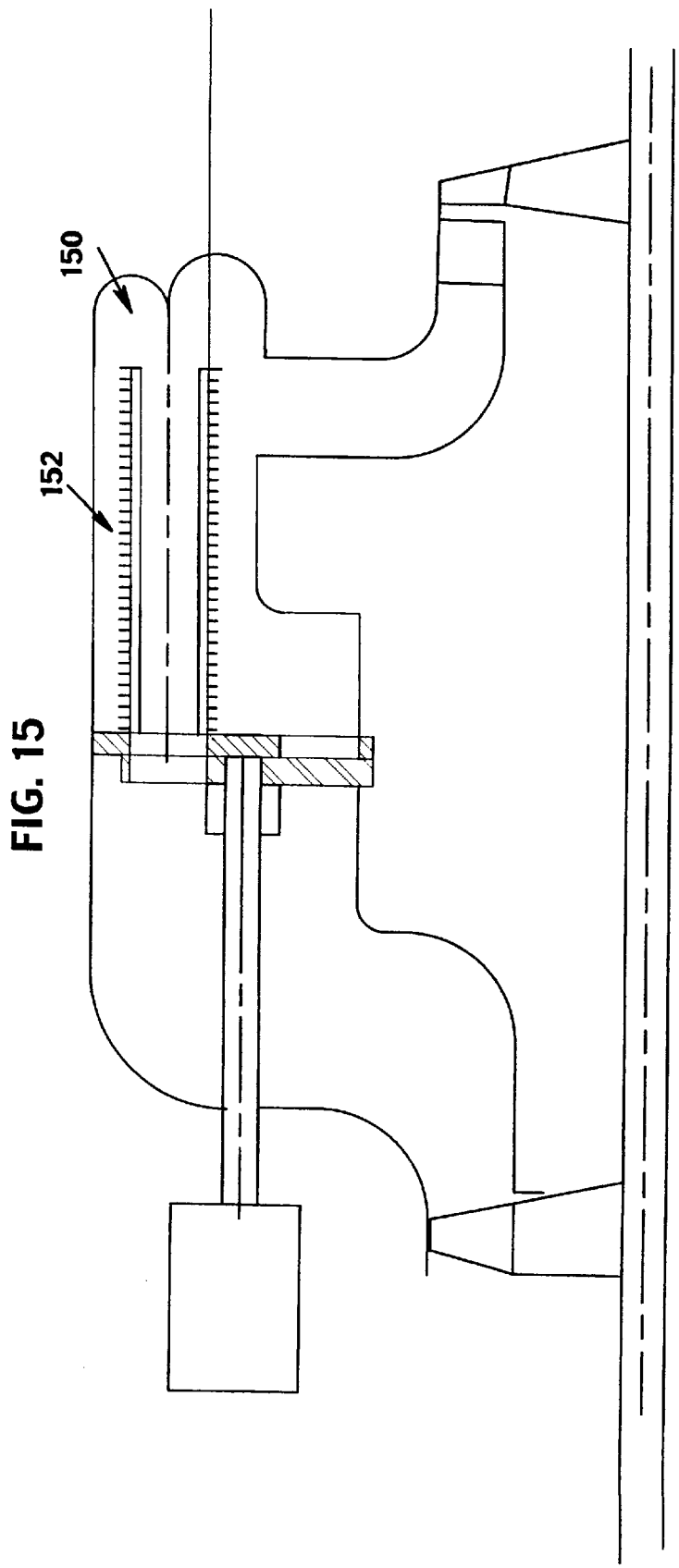
FIG. 15 illustrates a schematic diagram of an engine utilizing a high pressure cycle according to the present invention.

Although the steam cooling system described above may be very attractive, it may also be possible to eliminate use of a water jacket on the explosion chamber simply by increasing the heat transfer from the outside of the explosion chamber walls. As shown in FIG. 15, the incoming air surrounds the explosion chamber in the air chamber shown at 150. The fins, shown at 152, on the combustion wall transmit much more heat to the air than would be the case if the wall were smooth. By calculation, it appears that this scheme of cooling the walls may be more efficient, and also less costly than using water jackets either for direct cooling or for providing steam cooling to the blades.

Preliminary estimates of the potential size of the combustion chambers required for a high pressure cycle can be made by assuming a mass flow of air into the system and assuming conditions of operation as shown on column J of Table 2.

Assuming a flow of 385 pounds per second at conditions specified on column J. The net output of the turbine is then 194.7 BTUs per pound of air. The turbine output equals pounds per second times BTUs per pound times kilowatts per BTUs per second. The output would then be 385 times 194.7 times 1.055 equals 79,000 kilowatts.

The volume flow to the combustor equals 385 times 0.6309 cubic feet per pound at the compressor outlet or equals 242.9 cubic feet per second. At what might be considered a reasonable velocity of 200 feet per second the flow area would be 242.9/200, which equals 1.214 square feet.

Figure 17:
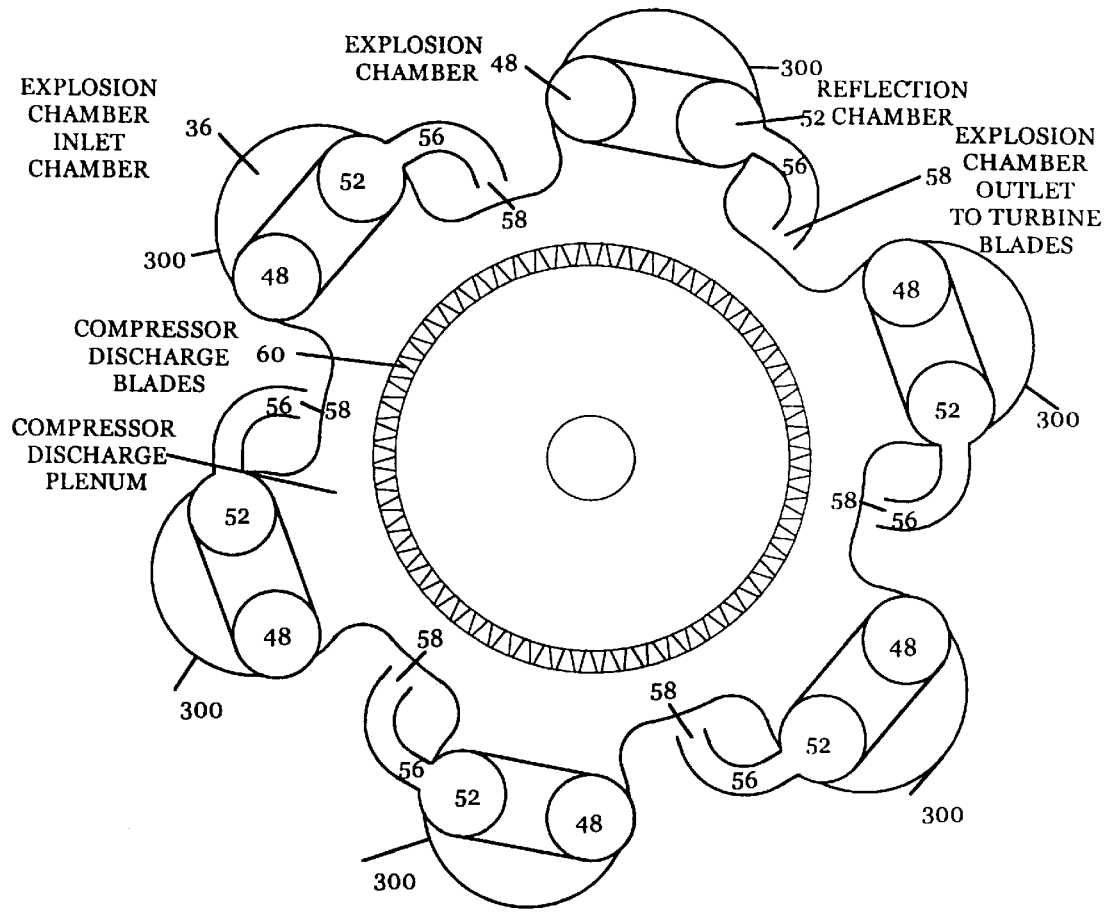
FIG. 17 illustrates a cut-away view of six high pressure cycles shown in FIG. 5 arranged circumferentially around the rotor blades.

If six combustors 300 are used, as shown in FIG. 17 the area for each equals 1.214/6=0.2024 square feet or the diameter of the chamber equals 6.09 inches. This appears to be a reasonable size for a turbine of this capacity.

The lengths of the combustors can be estimated by assuming a frequency of explosions and a mean acoustic velocity of the ignited gas and of the compressed gas in the compressor section. A mean temperature in the explosion end might be 3880° R and the acoustic velocity might be approximately 3005 feet per second. If the distributor valve having three holes is rotated at a rotating speed of 1800 RPM, then the wave period would be 1/90 of a second. At a period of 1/90 of a second, one quarter wave length would be 1/90×3005/4=8.35 feet.

In the compression end, assuming the mean temperature would be approximately 981° R, the acoustic velocity should be approximately 1511 feet per second. One quarter wave length would then be 4.20 feet. Based on these calculations, the total length of the combustion chamber should then be (8.35+4.20)=12.55 feet.

These sample calculations indicate that the size of the combustor for the high pressure cycle can be very reasonable, and can be fitted around the circumference of a turbine producing an output of about 79 megawatts.

Although the location in the combustion chamber where the gas mixture leaves to enter the turbine should be at a constant pressure, it is very likely that the pressure may not be exactly constant, and some pulsations in the pressure may occur. This may be undesirable if more than one combustor is used and all combustors fire in unison. Therefore, in order to minimize the pressure pulsation effect on the turbine inlet nozzles and blades the explosions in the separate combustion chambers should be synchronized so that they are out of phase, such as by having one-half of the combustion chambers being out of phase with the other half. Another solution for minimizing these pulsations at the turbine inlet would be to use slightly different lengths for the combustion chambers and slightly different frequencies of explosions. Either of these methods should assure that undesirable turbine blade vibrations can be avoided.

While a combustion chamber having two gas inlets has been described, it will be understood by one skilled in the art that the present invention can be practiced using one gas inlet. When using one gas inlet as opposed to two or more gas inlets, less gas may be pressurized in the air compression portion of the combustion chamber and the temperature of the pressurized gas leaving the combustion chamber will be higher. Thus, a combustion chamber having at least two gas inlets is preferred because more gas is compressed in the air compression chamber portion of the combustion chamber and the temperature of the pressurized gas leaving the combustion chamber will be significantly lower.

While the location of the gas outlet in the combustion chamber has been described as being located where the combustion chamber pressure is substantially constant, it will be understood by one skilled in the art that the gas outlet can be located elsewhere if desired. For example, if a substantially constant pressure is not required for the desired application, the gas outlet can be located in the combustion chamber where the combustion chamber pressure varies significantly. If maximum pressure is the goal, the gas outlet can be located near one of the reflecting surfaces, or other area in the combustion chamber where the combustion chamber pressure peaks (such as between E4 and E5, R1 and E3, or R2 and E6, in FIG. 7). In such applications, it may be desirable to use a check valve to prevent backflow into the combustion chamber. However, for most applications a constant gas pressure is desired.

While a U-shaped combustion chamber has been described above, it is understood by one skilled in the art that the shape of the combustion can be adjusted as desired. For example, the combustion chamber can be substantially straight or a combination of U-shapes. If desired, the combustion chamber can have a circular shape or a spiral shape that surrounds the turbine. The main concern is that the combustion chamber be constructed and arranged to provide at least one resonating pressure wave therein. Furthermore, the combustion chamber can have varying dimensions along the length thereof. For example, the volume per set length of the combustion chamber located near a reflecting surface can be greater than the volume per set length of the combustion chamber elsewhere, as shown in FIG. 11. In general, the greater the volume per set length of combustion chamber the lower the pressure of the gas contained therein. Preferably, the side walls of the combustion chamber, in the direction of the pressure wave travels, have substantially a round tube shape, as used in the Example. However, the side walls of the combustion chamber can also have as square, triangular, hexagonal, elliptical, or other shapes. Based on the disclosure provided herein, one skilled in the art will be able to select the desired dimensions of the combustion chamber to provide the desired resonating pressure wave and pressurized gas.

The high pressure cycle according to the present invention provides many important advantages over previously used gas turbine cycles as listed here.

1. The high pressure cycle can obtain higher thermal efficiencies than any cycle heretofore presented. This is important for saving fuel in an energy hungry world that is gradually depleting all available sources of fossil fuel.

2. The high pressure cycle has a higher efficiency and emits less carbon dioxide into the atmosphere. This is recognized today as an important factor in affecting the climate of the world, and is now considered so important that predictions are being made that a carbon tax will be imposed for all of the carbon dioxide emitted from a power plant into the atmosphere.

3. The use of detonation to ignite the air/fuel mixture provides improved burning with significantly reduced production of undesirable nitrogen oxides and other combustion by-products.

4. Refrigerating the inlet to a gas turbine removes the moisture from the air and thereby permits liquid injection intercooling, which in turn permits higher efficiency and higher capacity to be attained.

5. Refrigerating the inlet to the gas turbine greatly increases the output power for a given size turbine. This means a great deal in reducing the cost per kilowatt power output.

6. Liquid injection intercooling makes premixing of the fuel with the air possible, and assures that detonation in the combustion chamber is possible. This in turn assures more uniform combustion and less generation of nitrogen oxides in the combustion process.

7. In the high pressure cycle, the specific volume of the gas entering the turbine is much lower than that entering typical gas turbine blades. Therefore, the turbine blades can be shorter, easier to cool, and will be subject to less stress by nature of the blades being shorter.

8. Better blade cooling because of the shorter blades makes higher turbine inlet temperatures possible, which in turn increases potential turbine efficiency.

9. The higher efficiency of the high pressure cycle assures lower exhaust temperatures, which in turn assures higher overall efficiencies for combined cycles, because lower expansion ratios for the Rankine cycle can be used.

10. In the combined cycle, the use of a steam turbine can be avoided, and it is possible to use isobutane as the working fluid in the Rankine cycle which is run from the exhaust of the gas turbine. This permits condensing at much lower exhaust temperatures than can be used in a steam cycle, and in turn permits recovery of water from the exhaust. Recovery of water becomes more and more important as water becomes a scarce commodity throughout the world.

The present invention also provides an improved electrical power generating plant comprising at least one of the novel turbines described herein above driving an electrical generator. Any conventional electrical generator can be used to convert the mechanical energy of the turbine to electrical power. The power plant utilizing the improved turbine engines is capable of producing significantly less carbon dioxide and undesirable combustion by-products such as nitrogen oxides.

Preferably, the improved power plant further contains a Rankine cycle to utilize the energy contained in the exhaust gas of the turbine engine. The turbine engines according to the present invention can be driven to provide exhaust gasses having a temperature suitable for use in low temperature vapor turbine cycle, such as isobutane. Examples of other suitable low temperature vapor turbine cycles include propane, propylene, or other hydrocarbons, as well as fluorocarbons, and chlorofluorocarbons, of which there are many compounds commercially available. A low temperature vapor cycle typically operates at a temperature of about 400° F. or less.

The exhaust from a turbine engine according to the present invention is sufficiently low enough for directly driving a low temperature vapor cycle. This is a remarkable improvement because low temperature vapor turbine cycles are significantly more efficient and less expensive than high temperature vapor turbine cycles, such as steam.

Figure 16:
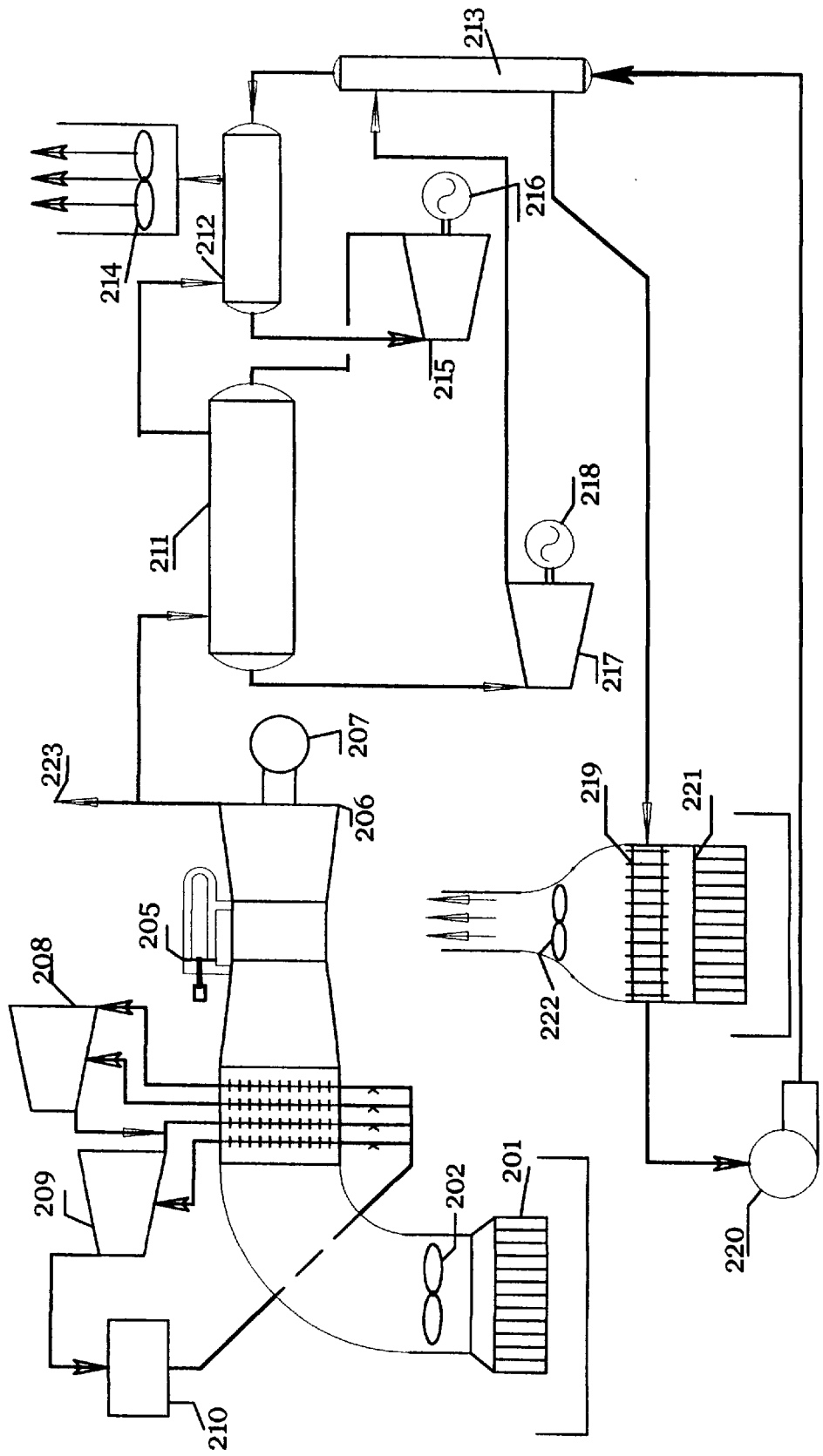
FIG. 16 illustrates a schematic diagram of a power plant according to the present invention.

FIG. 16 illustrates an example of power plant according to the present invention. Air enters the system through the air inlet saturation cooler shown at 201. An air inlet fan shown at 202 can be used to draw the air into the system. The air can then be cooled by passing through the air inlet refrigeration coils shown at 203. The cooled air can be compressed using the compressor shown at 204. The air can also be intercooled in the compressor so as to control the temperature of the compressed air leaving the compressor down to a temperature where fuel can be injected into or mixed with the compressed air without causing combustion prior to entering the combustion chamber. The compressed air can be further compressed and combusted by using the resonating combustion chamber shown at 205. This combustion chamber can be any one or combination of combustion chambers described herein above. After being compressed and combusted, the air can be used to drive a turbine, shown at 206. The turbine can be used to drive an electrical generator shown at 207.

The air inlet refrigeration coils can be refrigerated, for example, by using the low stage refrigerant compressor shown at 208, the high stage refrigerant compressor shown at 209, and the refrigerant condenser shown at 210.

The exhaust from the turbine in the present invention can surprisingly be made low enough to drive a low temperature vapor cycle. As shown in FIG. 16, the exhaust from the turbine is used to vaporize isobutane in the isobutane superheater shown at 211. The superheated isobutane can be used to drive the low pressure vapor turbine engine shown at 217. The low pressure vapor turbine engine can be used to drive an electrical generator shown at 218. The exhaust from the low pressure vapor turbine engine can be heated in the liquid heater shown at 213 and then transferred to the liquid heater and boiler shown at 212. Hot gas leaving the isobutane superheater 211 is passed through the liquid heater and boiler 212. The heated isobutane from the liquid heater and boiler 212 can be used to drive a high pressure vapor turbine shown at 215. The high pressure turbine can be used to drive an electrical generator shown at 216.

Exhaust from the liquid heater and boiler can be expelled through the exhaust stack with the induced draft fan shown at 214.

Isobutane usually exhausts from turbine 217 at temperatures well above the saturation or condensing temperature. Therefore, this isobutane exhaust can be used in the liquid heater 219, which preheats liquid isobutane coming from boiler feed pump 220 before it enters gas heated heater and boiler 212.

After leaving the liquid heater 213 the isobutane condenses to liquid in condensor 219 and the liquid then flows to pump 220, from whence it is pumped into liquid heater 213 to be preheated before entering boiler 212.

The air condenser 219 is cooled by air drawn over the condenser coils 219 by the induced draft fan 222.

Before passing through condenser coils 219, the air is cooled to nearly the wet bulb temperature by passing the air through air saturator 221. The saturator 221 is cooled by water sprayed over the opening of the saturator surfaces. The water flows down through the surfaces countercurrent to the air flow, and evaporates into the air, thereby cooling the air to nearly the wet bulb temperature.

Since the wet bulb temperature may be as high as 20 to 30° Fahrenheit below the ambient dry bulb temperature, the cooled air condenses the isobutane in condensor 219 to a much lower temperature than would be possible if ambient air was circulated over the condenser coils.

The lower condensing temperature achieved increases power output from isobutane turbine 217, and thereby increases power cycle efficiency.

The invention will be further explained using the following non-limiting examples.

EXAMPLE

A combustion chamber was formed using a 4 inch diameter tube having a length of approximately 20 feet. The inlet air was controlled by a rotary valve which alternately opened and closed the supply of air from an air compression system.

At the opposite end of the tube was an air compressor check valve, which allowed air to enter when the pressure wave was less than the average pressure in the combustion chamber and automatically close when the pressure wave was greater than the average pressure in the combustion chamber. The exhaust outlet from the combustion chamber was approximately at the middle of the tube. High frequency pressure transducers were installed at both ends of the tube, and also at the middle where the exhaust left through a throttling valve. The pressures were recorded on a high speed oscillograph with pressure plotted against time.

By adjusting the frequency of the rotary inlet valve and fuel flow, the explosions of the fuel/air mixture could be made to resonate. By actual measurements, the explosion pressure varied up and down, and the pressure at the opposite air inlet end also varied with the explosion pressure transmitted from the explosion at the fuel air mixture inlet end. The pressure at the exhaust near the middle of the chamber was substantially constant when the timing of the pressure wave was controlled to resonate so that the length of the chamber was approximately one-half the wave length of the explosion wave.

By experimenting and adjusting the frequency of the wave so that it resonated, the pressure ratio between the exhaust pressure and the inlet pressure was 1.04. A pressure ratio of 1.04 in a combustion process provides a significant increase in the efficiency of a gas turbine cycle, compared to one which had constant pressure combustion or somewhat less than constant pressure combustion due to friction in the combustion chamber causing a pressure drop between the inlet and the outlet to the turbine nozzles.

One of the critical problems in the experimental chamber was that the air inlet check valve could not be made to survive the high frequencies used in the explosion chamber.

However, in the design proposed above, the inlet distributor valve controls the flow both to the explosion chamber and to the air compression chamber. This can be accomplished as shown in FIGS. 9 and 10 by using a distributor valve with either three or five holes in it, so that the inlet hole to the explosion chamber opens alternately with the inlet hole to the air compression chamber. By using a return channel, the whole system is in effect folded so that the inlet to the explosion chamber and the inlet to the air compression chamber are both at the same end, and therefore can be controlled by a distributor valve motor that is operated at the correct frequency to cause resonating explosions.

While the present invention has been described in detail and with reference to specific embodiments, it is apparent to one of ordinary skill in the art that various changes and modifications can be made therein without departing from the scope and spirit of the claimed invention.

I claim:

1. A combustion chamber for producing a pressurized gas comprising:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber, said first inlet being located where the pressure in said combustion chamber varies, and said first inlet comprising a first inlet valve for controlling the flow of said first gas into said interior chamber, said first inlet valve being constructed and arranged to open and close in sync with said resonating pressure wave whereby said first inlet valve is open when lower than average interior chamber pressures are prevalent against said first inlet valve and closed when higher than average interior chamber pressures are prevalent against said first inlet valve;

at least one second inlet being located where a pressure varies in said combustion chamber, and said second inlet comprising a second inlet valve for controlling the flow of said second gas into said interior chamber, said second inlet valve being constructed and arranged to open and close in sync with said resonating pressure wave whereby said second inlet valve is open when lower than average interior chamber pressures are prevalent against said second inlet valve and closed when higher than average interior chamber pressures are prevalent against said second inlet valve; and at least one outlet from said interior chamber for drawing off a pressurized gas from said interior chamber, wherein said first inlet valve and said second inlet valve comprise a rotary valve.

2. A combustion chamber according to claim 1, wherein said outlet being located in said interior chamber where the pressure of said resonating pressure wave remains substantially constant.

3. A combustion chamber according to claim 1, wherein said first inlet is located closer to said first reflecting surface than said second reflecting surface.

4. A combustion chamber according to claim 1, wherein said first reflecting surface contains said first inlet.

5. A combustion chamber according to claim 1, wherein said second inlet being located closer to said second reflecting surface than said first reflecting surface.

6. A combustion chamber according to claim 5, wherein said second reflecting surface containing said second inlet.

7. A combustion chamber according to claim 1, wherein said first inlet is constructed and arranged such that when said first gas comprises a combustible gas and is introduced into said combustion chamber through said first inlet said first gas is ignited by said compression wave and forms a compression wave that resonates in said chamber, and said second inlet is constructed and arranged such that a second gas introduced into the combustion chamber through said second inlet is compressed by said compression wave and combines with a combustion gas formed from combusting said first gas to thereby form a pressurized gas.

8. A combustion chamber according to claim 7, wherein said outlet is constructed and arranged to withdraw said pressurized gas at substantially a constant pressure.

9. A combustion chamber according to 1, wherein said rotary valve alternately opens said first inlet valve and said second inlet valve.

10. A combustion chamber according to claim 1, wherein said first reflecting surface defines a wall of said walled structure and said first reflecting surface contains said first inlet and said second reflecting surface defines a wall of said walled structure and said second reflecting surface contains said second inlet, and said interior chamber is constructed and arranged such that said first and second inlets are in line with a rotatable valve.

11. A combustion chamber according to claim 10, wherein said interior chamber having substantially the shape of a U.

12. A combustion chamber according to claim 1, further comprising a chamber constructed and arranged such that compressed air can contact an exterior surface of said wall structure to thereby cool said wall structure.

13. A combustion chamber according to claim 12, wherein said exterior surface comprises cooling fins to facilitate cooling of said wall structure.

14. A turbine engine comprising:

at least one combustion chamber;

at least one compressor constructed and arranged to provide a compressed gas to said at least one combustion chamber; and at least one turbine blade constructed and arranged to be driven by a pressurized gas formed in said combustion chamber; wherein said combustion chamber comprises:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber, said first inlet being located where the pressure in said combustion chamber varies, and said first inlet comprising a first inlet valve for controlling the flow of said first gas into said interior chamber, said first inlet valve being constructed and arranged to open and close in sync with said resonating pressure wave whereby said first inlet valve is open when lower than average interior chamber pressures are prevalent against said first inlet valve and closed when higher than average interior chamber pressures are prevalent against said first inlet valve;

at least one second inlet for introducing said compressed gas into said interior chamber being located where a pressure varies in said combustion chamber, and said second inlet comprising a second inlet valve for controlling the flow of said second gas into said interior chamber, said second inlet valve being constructed and arranged to open and close in sync with said resonating pressure wave whereby said second inlet valve is open when lower than average interior chamber pressures are prevalent against said second inlet valve and closed when higher than average interior chamber pressures are prevalent against said second inlet valve, said second inlet being connected to said at least one compressor; and at least one outlet from said interior chamber for drawing off said pressurized gas from said chamber and being constructed and arranged to supply said pressurized gas to said at least one turbine blade, wherein said first inlet valve and said second inlet valve comprise a rotary valve.

15. A turbine engine according to claim 14, wherein said outlet being located in said interior chamber where the pressure of said resonating pressure wave remains substantially constant, whereby said pressurized gas has a substantially constant pressure.

16. A turbine engine according to claim 15, wherein said first reflecting surface defines a wall of said walled structure and said first reflecting surface contains said first inlet.

17. A turbine engine according to claim 14, wherein said gas outlet is located closer to said second reflecting surface than said first reflecting surface.

18. A turbine engine according to claim 14, wherein said second reflecting surface defines a wall of said walled structure and said second reflecting surface contains said second inlet.

19. A turbine engine according to claim 14, wherein said first inlet is constructed and arranged such that when said first gas comprises a combustible gas and is introduced into said combustion chamber through said first inlet said first gas is ignited by said compression wave and forms a compression wave that resonates in said chamber, and said second inlet is constructed and arranged such that said compressed gas introduced into the combustion chamber through said second inlet is further compressed by said compression wave and combines with a combustion gas formed from combusting said first gas to thereby form said pressurized gas.

20. A turbine engine according to claim 19, wherein said outlet is constructed and arranged to withdraw said pressurized gas at substantially a constant pressure.

21. A turbine engine according to claim 27, wherein said interior chamber is constructed and arranged such that said first and second inlets are in line with a rotatable valve.

22. A turbine engine according to claim 21, wherein said interior chamber having substantially the shape of a U.

23. A turbine engine according to 14, wherein said rotary valve alternately opens said first inlet valve and said second inlet valve.

24. A turbine engine according to claim 14, further comprising a chamber constructed and arranged such that compressed air can contact an exterior surface of said wall structure to thereby cool said wall structure.

25. A turbine engine according to claim 24, wherein said exterior surface comprises cooling fins to facilitate cooling of said wall structure.

26. A turbine engine according to claim 14, further comprising a means for cooling said at least one turbine blade.

27. A turbine engine according to claim 26, wherein said cooling means comprises a second outlet connected to said interior chamber in a location where the combustion chamber pressure varies, said second outlet being constructed and arranged to supply said pressurized gas to said turbine blade.

28. A turbine engine according to claim 14, further comprising a water cooling jacket constructed and arranged to cool said wall structure.

29. A turbine engine according to claim 28, further comprising a means for transferring steam produced from said water cooling jacket to said at least one turbine blade to thereby cool said at least one turbine blade.

30. A turbine engine according to claim 14, further comprising a plurality of said combustion chambers, at least two of said combustion chambers being out of phase.

31. A turbine engine according to claim 14, further comprising an intercooler to control the temperature of the compressed gas discharged from the compressor.

32. A turbine engine according to claim 31, wherein said intercooler is adapted to control the temperature of the compressed gas to a temperature lower than the ignition temperature of the compressed gas.

33. An electrical generating power plant comprising:

at least one turbine engine;

at least one electrical generator connected to said turbine engine; wherein said turbine engine comprises:

at least one combustion chamber;

at least one compressor constructed and arranged to provide a compressed gas to said at least one combustion chamber; and at least one turbine blade constructed and arranged to be driven by a pressurized gas formed in said combustion chamber; wherein said combustion chamber comprises:

a wall structure defining an interior chamber;

a first reflecting surface for reflecting a pressure wave within said interior chamber;

a second reflecting surface for reflecting said pressure wave within said interior chamber, wherein said first and second reflecting surfaces being constructed and arranged to resonate said pressure wave in said interior chamber;

at least one first inlet for introducing a first gas into said interior chamber, said first inlet being located where the pressure in said combustion chamber varies, and said first inlet comprising a first inlet valve for controlling the flow of said first gas into said interior chamber, said first inlet valve being constructed and arranged to open and close in sync with said resonating pressure wave whereby said first inlet valve is open when lower than average interior chamber pressures are prevalent against said first inlet valve and closed when higher than average interior chamber pressures are prevalent against said first inlet valve;

at least one second inlet for introducing said compressed gas into said interior chamber comprising a second inlet valve, said second inlet being connected to said at least one compressor; and at least one outlet from said interior chamber for drawing off said pressurized gas from said chamber and being constructed and arranged to supply said pressurized gas to said turbine blade, wherein said first inlet valve and said second inlet valve comprise a rotary valve.

34. An electrical generating power plant according to claim 33, further comprising a low temperature vapor cycle connected to the exhaust of said turbine engine, and said turbine engine being adapted to provide an exhaust temperature suitable for boiling a fluid into a vapor and driving said low temperature vapor turbine.

35. An electrical generating power plant according to claim 34, wherein said low temperature vapor cycle utilizes isobutane.

36. An electrical generating power plant according to claim 33, wherein said outlet being located in said interior chamber where the pressure of said resonating pressure wave remains substantially constant, whereby said pressurized gas has a substantially constant pressure.

37. An electrical power generating power plant according to claim 33, wherein said second inlet being located where the pressure in said combustion chamber varies, and said second inlet comprising a second inlet valve for controlling the flow of said second gas into said interior chamber, said second inlet valve being constructed and arranged to open and close in sync with said resonating pressure wave whereby said second inlet valve is open when lower than average interior chamber pressures are prevalent against said second inlet valve and closed when higher than average interior chamber pressures are prevalent against said second inlet valve.

38. An electrical power generating power plant according to claim 33, wherein said first inlet is constructed and arranged such that when said first gas comprises a combustible gas and is introduced into said combustion chamber through said first inlet said first gas is ignited by said compression wave and forms a compression wave that resonates in said chamber, and said second inlet is constructed and arranged such that said compressed gas introduced into the combustion chamber through said second inlet is further compressed by said compression wave and combines with a combustion gas formed from combusting said first gas to thereby form said pressurized gas.

39. An electrical power generating power plant according to claim 33, further comprising at least one turbine engine containing a plurality of said combustion chambers, at least two of said combustion chambers being out of phase.

40. An electrical power generating power plant according to claim 33, further comprising an air cooler connected to said air compressor to cool air being drawn into said air compressor.

41. An electrical power generating power plant according to claim 33, further comprising an intercooler to control the temperature of the compressed gas discharged from the compressor.

42. An electrical power generating power plant according to claim 41, wherein said intercooler is adapted to control the temperature of the compressed gas to a temperature lower than the ignition temperature of the compressed gas.

43. A method of forming a pressurized gas having a temperature lower than a combustion temperature of a combustible gas used to form said pressurized gas comprising the steps of:

introducing a combustible gas into a combustion chamber having first and second reflecting surfaces that are constructed and arranged to provide a resonating pressure wave reflecting between said first and second reflecting surfaces, said combustible gas being introduced into said combustible chamber at a frequency such that said resonating pressure wave ignites said combustible gas to thereby form a resonating pressure wave;

introducing a second gas into said combustion chamber at a location and frequency such that said pressure wave compresses and combines with said second gas to form a pressurized gas having a temperature lower than a combustion temperature of said combustible gas; and withdrawing said pressurized gas from said combustion chamber, wherein said first and second gases are introduced into said combustion chamber through a rotary valve.

44. A method according to claim 43, wherein said pressurized gas is withdrawn from said combustion chamber at a location that provides said pressurized gas with a substantially stable pressure.

45. A method according to claim 43, wherein said combustible gas comprises air and fuel, and said air and said fuel are introduced separately into said combustion chamber whereby said combustible gas is formed in said combustion chamber.

46. A method according to claim 43, wherein said combustible gas comprises air and fuel which are combined prior to introducing the combustible gas into said combustion chamber.

* * * * *